(12) United States Patent
Masters

(10) Patent No.: US 6,473,802 B2
(45) Date of Patent: *Oct. 29, 2002

(54) METHOD AND SYSTEM FOR STORING LOAD BALANCING INFORMATION WITH AN HTTP COOKIE

(75) Inventor: Richard R. Masters, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/006,555

(22) Filed: Dec. 4, 2001

(65) Prior Publication Data

US 2002/0040400 A1 Apr. 4, 2002

Related U.S. Application Data

(63) Continuation of application No. 09/353,335, filed on Jul. 15, 1999, now Pat. No. 6,374,300.

(51) Int. Cl.[7] .............................................. G06F 13/00

(52) U.S. Cl. ..................... 709/229; 709/105; 709/225; 709/219

(58) Field of Search ................................ 709/105, 201, 709/202, 203, 217, 219, 223, 225, 226, 227, 229, 313, 328, 329

(56) References Cited

U.S. PATENT DOCUMENTS

| | | | |
|---|---|---|---|
| 3,950,735 A | 4/1976 | Patel | 340/172.5 |
| 4,644,532 A | 2/1987 | George et al. | 370/94 |
| 4,965,772 A | 10/1990 | Daniel et al. | 364/900 |
| 5,023,826 A | 6/1991 | Patel | 364/736 |
| 5,053,953 A | 10/1991 | Patel | 364/200 |
| 5,299,312 A | 3/1994 | Rocco, Jr. | 395/200 |

(List continued on next page.)

FOREIGN PATENT DOCUMENTS

| | | |
|---|---|---|
| EP | 0 744 850 A2 | 11/1996 |
| WO | WO 91/14326 | 9/1991 |
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |

(List continued on next page.)

OTHER PUBLICATIONS

"A Process For Selective Routing of Servlet Content To Transcoding Modules," *Research Disclosure 422124*, IBM Corporation, pp. 889–890, Jun. 1999.

"Servlet/Applet/HTML Authentication Process With Single Sign–On," *Research Disclosure 429128*, IBM Corporation, pp. 163–164, Jan. 2000.

*Primary Examiner*—Viet D. Vu
(74) *Attorney, Agent, or Firm*—Merchant & Gould P.C.; John W. Branch

(57) ABSTRACT

A method and system for inserting and examining Cookies in the data streams of HTTP connections for the purpose of persistently directing HTTP connections to the same destination. The invention enables a network device to direct subsequent HTTP connections from the same client to the same server (destination) for accessing the requested resources. There are four modes for employing the Cookie to persistently direct HTTP connections. The associative mode inserts a Cookie that uniquely identifies the client into an HTTP response. The passive mode inserts Cookie information that uniquely identifies a previously selected destination into an HTTP response. In the rewrite mode, a network device manages the destination information that is rewritten over blank Cookie information generated by the destination producing the HTTP response. The insert mode inserts and removes Cookie information in the data packets for HTTP requests and responses prior to processing by the destination.

52 Claims, 15 Drawing Sheets

U.S. PATENT DOCUMENTS

| | | | |
|---|---|---|---|
| 5,327,529 A | 7/1994 | Fults et al. | 395/155 |
| 5,367,635 A | 11/1994 | Bauer et al. | 395/200 |
| 5,371,852 A | 12/1994 | Attanasio et al. | 395/200 |
| 5,406,502 A | 4/1995 | Haramaty | 364/551.1 |
| 5,475,857 A | 12/1995 | Dally | 395/800 |
| 5,517,617 A | 5/1996 | Sathaye et al. | 395/200.1 |
| 5,519,694 A | 5/1996 | Brewer et al. | 370/54 |
| 5,519,778 A | 5/1996 | Leighton et al. | 380/30 |
| 5,521,591 A | 5/1996 | Arora et al. | 340/826 |
| 5,528,701 A | 6/1996 | Aref | 382/178 |
| 5,581,764 A | 12/1996 | Fitzgerald et al. | 395/703 |
| 5,596,742 A | 1/1997 | Agarwal et al. | 395/500 |
| 5,606,665 A | 2/1997 | Yang et al. | 395/200.2 |
| 5,611,049 A | 3/1997 | Pitts | 395/200.9 |
| 5,663,018 A | 9/1997 | Cummings et al. | 430/5 |
| 5,752,023 A | 5/1998 | Chourci et al. | 395/610 |
| 5,761,484 A | 6/1998 | Agarwal et al. | 395/500 |
| 5,768,423 A | 6/1998 | Aref et al. | 382/228 |
| 5,774,660 A | 6/1998 | Brendel et al. | 395/200.31 |
| 5,875,296 A | 2/1999 | Shi et al. | 395/188.01 |
| 5,892,914 A | 4/1999 | Pitts | 395/200.49 |
| 5,919,247 A | 7/1999 | Van Hoff et al. | 709/217 |
| 5,936,939 A | 8/1999 | Des Jardins et al. | 370/229 |
| 5,946,690 A | 8/1999 | Pitts | 707/10 |
| 5,949,885 A | 9/1999 | Leighton | 380/54 |
| 5,959,990 A | 9/1999 | Frantz et al. | 370/392 |
| 5,974,460 A | 10/1999 | Maddalozzo, Jr. et al. | 709/224 |
| 5,983,281 A | 11/1999 | Ogle et al. | 709/249 |
| 5,991,878 A * | 11/1999 | McDonough et al. | 713/200 |
| 6,006,260 A | 12/1999 | Barrick, Jr. et al. | 709/224 |
| 6,006,264 A | 12/1999 | Colby et al. | 709/226 |
| 6,026,452 A | 2/2000 | Pitts | 710/56 |
| 6,028,857 A | 2/2000 | Poor | 370/351 |
| 6,051,169 A | 4/2000 | Brown et al. | 264/40.1 |
| 6,078,956 A | 6/2000 | Bryant et al. | 709/224 |
| 6,085,234 A | 7/2000 | Pitts | 709/217 |
| 6,092,196 A | 7/2000 | Reiche | 713/200 |
| 6,098,093 A * | 8/2000 | Bayeh et al. | 709/203 |
| 6,108,703 A | 8/2000 | Leighton et al. | 709/226 |
| 6,111,876 A | 8/2000 | Frantz et al. | 370/392 |
| 6,272,523 B1 * | 8/2001 | Factor | 709/201 |
| 6,345,303 B1 * | 2/2002 | Knauerhase et al. | 709/238 |

FOREIGN PATENT DOCUMENTS

| | | |
|---|---|---|
| WO | WO 99/39373 | 8/1999 |
| WO | WO 99/64967 | 12/1999 |
| WO | WO 00/04422 | 1/2000 |
| WO | WO 00/04458 | 1/2000 |

* cited by examiner

OVERVIEW OF HTTP
REQUEST W/O COOKIE

**OVERVIEW OF
HTTP REQUEST
W/COOKIE**

ASSOCIATIVE / HTTP
REQUEST W/O COOKIE

ASSOCIATIVE / HTTP
REQUEST W/COOKIE

PASSIVE/HTTP
REQUEST W/O COOKIE

PASSIVE/HTTP REQUEST W/COOKIE

REWRITE/HTTP
REQUEST W/O COOKIE

REWRITE / HTTP
REQUEST W/COOKIE

INSERT/HTTP
REQUEST W/O COOKIE

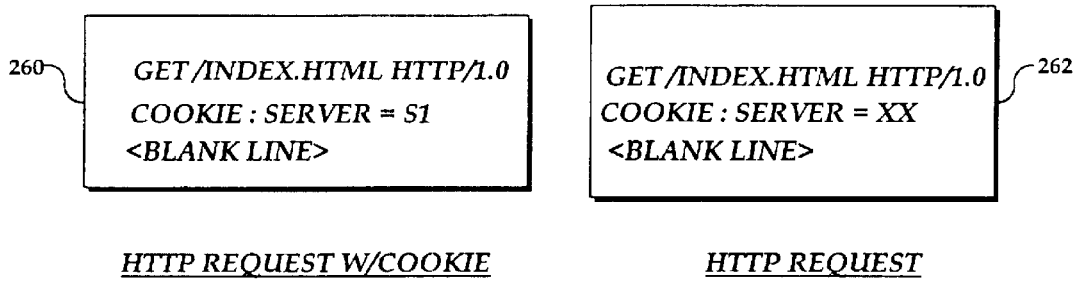
*HTTP REQUEST W/COOKIE INDENTIFYING SERVER*
FIG. 7A
*HTTP REQUEST W/ BLANK COOKIE*
FIG. 7B
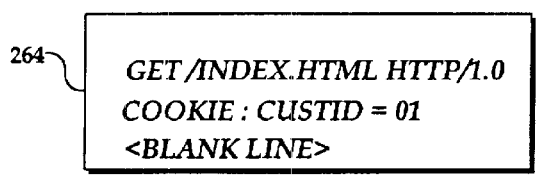
*HTTP REQUEST W/COOKIE INDENTIFYING CLIENT*
FIG. 7C
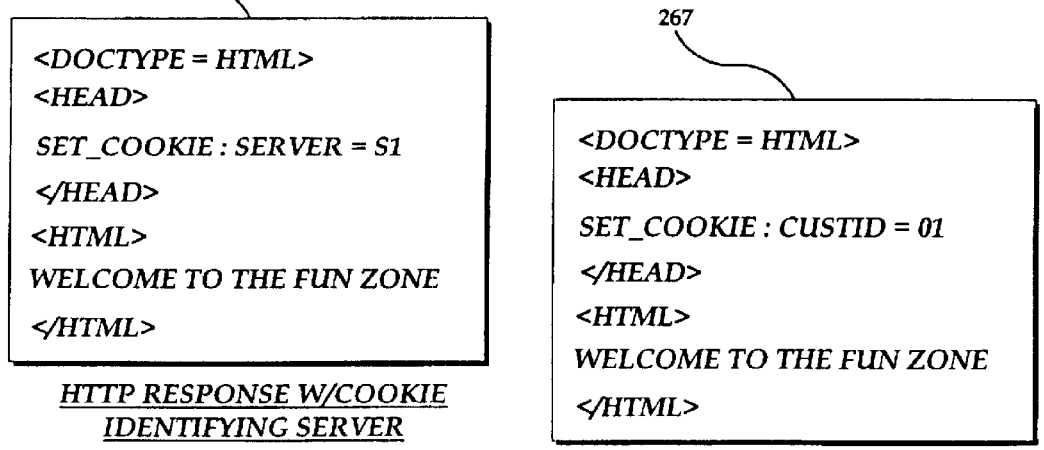
*HTTP RESPONSE W/COOKIE IDENTIFYING SERVER*
FIG. 7D
*HTTP RESPONSE W/COOKIE IDENTIFYING CLIENT*
FIG. 7E

METHOD AND SYSTEM FOR STORING LOAD BALANCING INFORMATION WITH AN HTTP COOKIE

RELATED APPLICATION

This application is a Utility Patent application that is a continuation of previously filed U.S. Utility Patent application, U.S. Ser. No. 09/353,335 filed Jul. 15, 1999, now U.S. Pat. No. 6,374,300.

FIELD OF THE INVENTION

This application relates generally to distributing the load demand between servers on a network, and, more specifically, to employing an HTTP cookie to balance the load demand between servers on a wide area network of geographically distributed servers such as the Internet.

BACKGROUND OF THE INVENTION

Generally, it has proven difficult to reliably and efficiently load balance the demand for access to resources, e.g., a web-based application, email and streamed multimedia data, on a wide area network (WAN). One prior art attempt employed a look up table for storing a relationship mapping between a client's ip address and the ip address of the actual server that provided access to the resources for a domain name/ip address request. This table was usually held in the memory of a server array controller that managed several node servers that could provide access to the resources associated with the client's request. Typically, the server array controller would employ a load balancing technique to select and map the ip address of one of the managed node servers to the client's actual ip address and store this mapped relationship with a time stamp in the table. In this way, when a client repeated an request before the expiration of the time stamp, the controller would use the mapping stored in the table to automatically connect the client to the previously selected (load balanced) node server.

Additionally, if the time stamp had expired, the server array controller would again perform the load balancing technique to select one of the managed node servers to provide the actual access to the resources associated with the request. Each time the load balancing technique was performed, the controller would update the table to include a new time stamp and a new mapping of the client's unique ip address to the currently selected node server's ip address.

For a relatively small number of client requests, the above described prior art solution could reduce the demand on server array controller resources because the controller did not always have to perform a load balancing technique for each client request that occurred before the expiration of the time stamp. Instead, the controller only performed the load balancing technique for a new client request when the time stamp for a previous client request was expired. However, since all of the table entries had to be kept in the memory of the server array controller to be used effectively, the available controller resources for load balancing and managing several node servers decreased in proportion to an increase in the number of client requests. To ensure that table entries were not lost when the server array controller lost power or was rebooted, a copy of the table would be stored on a secondary storage medium. Also, under heavy load conditions, the secondary storage medium was often not fast enough to store the copy of table entries before the server array controller shut down.

Another significant problem with the prior art approach was that the client's ip address was not always unique. Although some clients might have their own unique ip address, many others used random virtual client ip addresses provided by a large Internet Service Provider (ISP), e.g., the America On-Line Corporation, to connect to the Internet. Since only a portion of a large ISP's clients are typically connected at any one time, a large ISP usually employs a proxy cache to randomly assign a relatively small number of virtual client ip addresses to the currently "on-line" (customers) clients. Typically, a proxy cache will assign one of the virtual client ip addresses to a client on a first available basis each time the client connects to the ISP and starts a session on the Internet. From the discussion above, it is apparent that when a client used a large ISP to connect to a WAN such as the Internet, the prior art did not provide an effective method for persistently mapping a client's relationship to the server that was selected to provide access to resources associated with a request.

Therefore, it is desirable to provide a method and system for automatically providing a persistent mapping of a previously selected destination for a domain name/ip address request. Preferably, the present invention employs a Cookie in a Hyper Text Transport Protocol (HTTP) data stream to identify a relationship between a previously selected destination and a client's HTTP request. The present invention overcomes many of the limitations of the prior art caused by the direct mapping of an actual destination ip address to a client's ip address.

SUMMARY OF THE INVENTION

In accordance with the present invention, a method for load balancing access to a resource identified in an HTTP request. The method includes: (1) examining an HTTP request to determine when a Cookie is included with the HTTP request, the Cookie may include information that indicates a destination for accessing the resource identified in the HTTP request; (2) when the Cookie is included in the HTTP request, sending the HTTP request to the destination that is indicated by the Cookie's information; (3) generating an HTTP response at the destination, the HTTP response providing access to the requested resource; (4) inserting a copy of the information in the Cookie; and (5) sending the HTTP response with the copy of the information in the Cookie to the sender of the HTTP request, so that a subsequent HTTP request to access the resource will include another Cookie with information indicating that the resource is accessible at the destination.

In accordance with other aspects of the present invention, the method provides for sending the HTTP request to a server array controller that manages a plurality of node servers. The server array controller selects one of the plurality of node servers to receive the HTTP request based on the information in the Cookie. The selected node server is associated with the destination and generates the HTTP response that includes the copy of the information in the Cookie.

In accordance with yet other aspects of the present invention, the method provides for including an identifier with the copy of the information in the Cookie. The identifier associates the selected node server with the destination. The identifier may be encoded by a mathematical product such as a hash value. Also, a time stamp may be generated by the node server, server array controller or any network transmission device and included in the HTTP response.

In accordance with additional aspects of the present invention, the method provides for employing a selected node server to generate the HTTP response and includes a blank identifier in the copy of the information in the Cookie. In this case, the server array controller may write the identifier over the blank identifier in the copy of the information in the Cookie. The method may also provide for changing an expiration date for the time stamp relative to the number of HTTP requests sent to the server array controller over a period of time. The expiration date for the time stamp can be increased when the number of HTTP requests sent to the server array controller are greater than a determined value over a period of time. Alternatively, the expiration date for the time stamp may be decreased when the number of HTTP requests sent to the server array controller are less than a determined value over a period of time.

In accordance with other aspects of the present invention, the method provides for employing the server array controller to select one of the plurality of node servers to receive the HTTP request and generate the HTTP response providing access to the requested resource when the Cookie is not included in the HTTP request. The present invention provides for sending an HTTP response to the sender of the HTTP request with information for creating another Cookie, so that a subsequent HTTP request to access the resource will include the other Cookie with information indicating that the selected node server is the destination for accessing the requested resource.

In accordance with still other aspects of the present invention, the method provides for employing the server array controller to balance the load demand on the plurality of node servers by determining the optimal node server to receive the HTTP request and generate the HTTP response. The server array controller may employ one of a plurality of functions to determine the optimal node server to balance the load demand. These functions include round trip time, round robin, least connections, packet completion rate, quality of service, server array controller packet rate, topology, global availability, hops, static ratio and dynamic ratio.

In accordance with additional aspects of the present invention, until the HTTP request is provided to the server array controller, the method provides for employing the server array controller to buffer communication between the sender and the destination. Also, when the HTTP request is provided to the server array controller, replaying in consecutive order the buffered communication to at least one of the plurality of node servers that is associated with the destination.

In accordance with other aspects of the present invention, a plurality of Cookies may be included with the HTTP request. Each Cookie can have a different type that indicates how the information included in a Cookie is to be utilized. The different types of Cookie include priority, path and hops. The path type of Cookie includes information indicating all of the interim destinations between the sender and the destination for an HTTP request. The interim destinations include a router, host machine, server array controller, firewall, node server and client. The hops type of Cookie includes information indicating a portion of the interim destinations between the sender and the destination for an HTTP request. The priority type of Cookie includes information indicating when the HTTP request and/or response associated with the Cookie is to be processed prior to the processing of other HTTP communications. The priority type of Cookie may include an indication that identifies a priority for processing the HTTP request and/or response prior to the processing of the other HTTP communications.

In accordance with yet other aspects of the present invention, wherein the sender may include a client, server and host machine. Also, the destination can include a host machine, server array controller, router, node server, firewall and client.

In accordance with the present invention, another method for load balancing access to a resource identified in an HTTP request, comprising: (1) examining an HTTP request to determine when a Cookie is included with the HTTP request, the Cookie including information that identifies a sender of the HTTP request; (2) when the Cookie is included in the HTTP request, comparing the information identifying the sender to a table of at least one destination, the HTTP request being sent to a destination that is associated with the identified sender in the table; (3) generating an HTTP response at the destination, the HTTP response providing access to the requested resource and including a copy of the information in the Cookie; and (4) sending the HTTP response with the copy of the information in the Cookie to the identified sender of the HTTP request, so that a subsequent HTTP request to access the resource from the identified sender will include another Cookie with information that identifies the sender of the subsequent HTTP request.

In accordance with other aspects of the present invention, the other method provides for employing a server array controller that manages a plurality of node servers. The server array controller comparing the information identifying the sender to a destination that is associated with the identified sender in the table. The destination can be one of the node servers managed by the server array controller.

In accordance with yet additional aspects of the present invention, a system which implements substantially the same functionality in substantially the same manner as the methods described above is provided.

In accordance with other additional aspects of this invention, a computer-readable medium that includes computer-executable instructions may be used to perform substantially the same methods as those described above is provided.

In accordance with yet other aspects of the present invention, an additional method for load balancing access to a resource identified in an HTTP request, comprising: (1) receiving at a server array controller an HTTP request; (2) examining by the server array controller the HTTP request to determine when a Cookie is included with the HTTP requests, wherein the Cookie includes information that indicates a destination server for accessing the resource identified in the HTTP request; (3) when the Cookie exists, sending the HTTP request to the destination server indicated by the Cookie's information; (4) generating an HTTP response at the destination server, the HTTP response providing access to the requested resource; (5) inserting a copy of the information in the Cookie into the HTTP response; and (6) sending the HTTP response with the copy of the information in the Cookie to the sender of the HTTP request, so that a subsequent HTTP request to access the resource will include another Cookie with information indicating that the resource is accessible at the destination.

In accordance with the yet other aspects, the additional method provides for receiving the HTTP response at the server array controller; and when the Cookie in the request does not exist, inserting or rewriting information in a Cookie in the HTTP response to identify the selected destination server.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 7A–7C show exemplary code fragments of HTTP requests that include Cookies;

FIGS. 7D and 7E illustrate exemplary code fragments of HTTP responses that include information for setting Cookies at the senders of the associated HTTP requests;

DETAILED DESCRIPTION OF THE PREFERRED EMBODIMENT

Figure 1A:
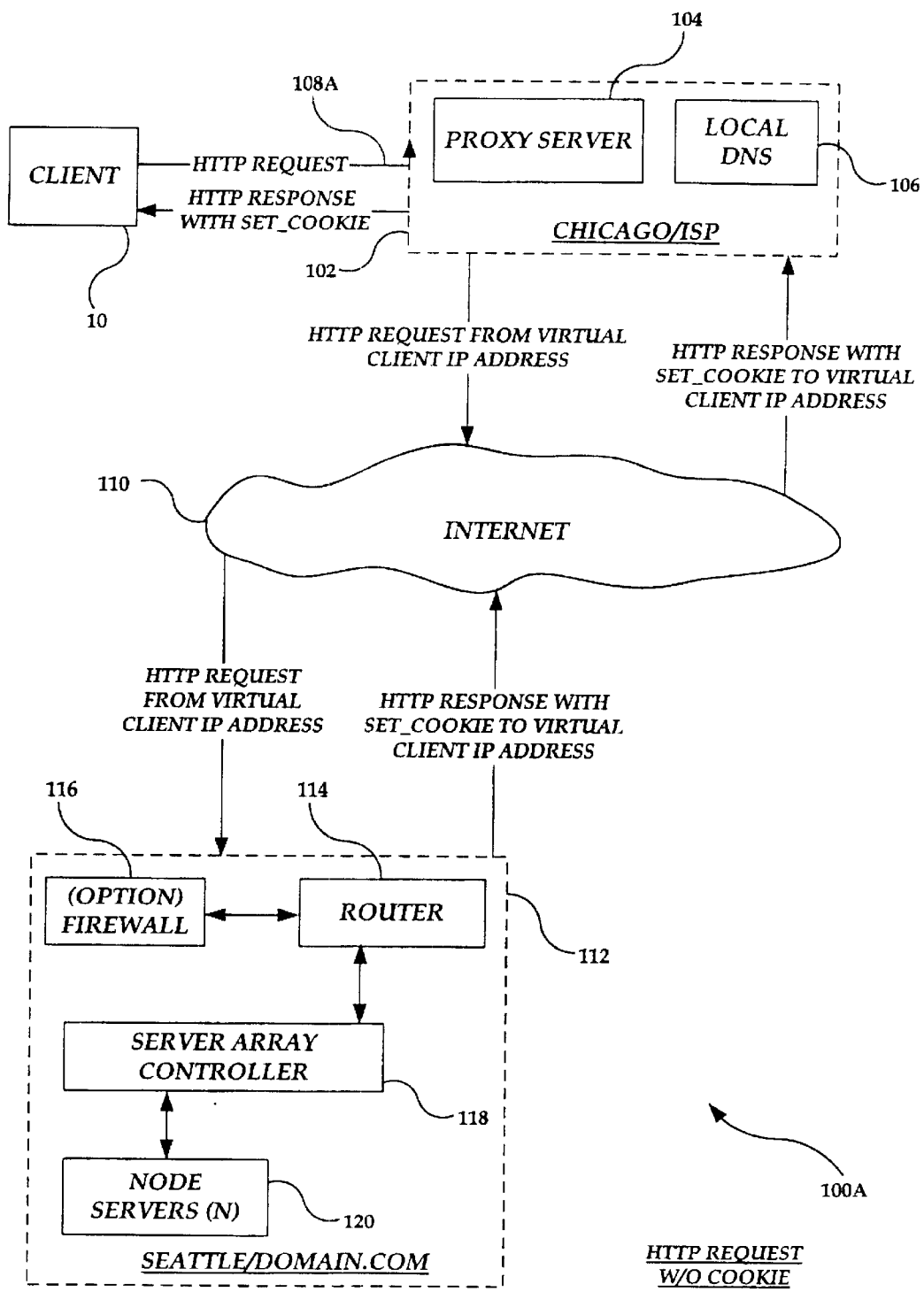
FIG. 1A is a schematic overview of a system for processing an HTTP request that does not include a Cookie.

The present invention is directed to inserting and examining HTTP Cookies in the data streams of HTTP connections for the purpose of persistently directing HTTP connections to the same destination. The present invention enables a network transmission device, e.g., a router, to reliably and conveniently direct subsequent HTTP connections from the same client to the same server for accessing requested resources.

HTTP is an application level protocol for transferring resources across the Internet, e.g., a network data object or server, and it is specified by the URL. The Hyper Text Mark-up Language (HTML) is a simple data format that is used to create hypertext documents that are supported by the HTTP protocol. Together, these standards have contributed to create the World Wide Web (WWW) on the Internet. The WWW is a globally accessible and platform-independent hypermedia information system that has become a central access point to applications and services for people around the world.

A Cookie is a general mechanism, i.e., protocol, which server side connections can use to both store and retrieve information on the client side of the connection. The addition of a simple, persistent, client-side state significantly extends the capabilities of Internet-based client/server applications programs. A server, when returning an HTTP object to a client, may also send a piece of state information which the client may store. Included in that state object is a description of the range of Uniform Resource Locators (URLs) for which the returned state is valid. Any future HTTP requests made by the client which fall in that range will include a transmittal of the current values of the state object from the client back to the sender. This state object is called a "Cookie," for no compelling reason.

The Cookie mechanism provides a powerful tool that enables different types of application programs to be written for Internet-based environments. For example, a service program could use a Cookie to send back registration information and free the client from retyping a user identification number for each connection to the service. Also, an Internet site could store user preferences for a client and have the client supply those preferences each time that the client connected to the site.

Generally, a Cookie is introduced to the client by including information with a Set-Cookie command in a header as part of an HTTP response. An example of the Set-Cookie command included in an HTTP response header is listed below.

<HEADER>
Set-Cookie: NAME=VALUE; expires=DATE;
path=PATH; domain=DOMAIN NAME; secure
</HEADER>

When a client's browser program is requesting a URL from an HTTP server on the Internet, the browser will match the requested URL against all of the URLs stored in the client's Cookies. If the requested URL matches any of the stored URLs, a line containing the name/value pairs of all matching Cookies will be included in the HTTP request. An exemplary line in a Cookie for an HTTP request could be included as follows: Cookie: NAME1=OPAQUE STRING1; NAME2=OPAQUE STRING2.

A Cookie is typically used to save the state of a relationship between a client and a server. However, in some cases, the saved state of the relationship may create a load balancing problem. For example, each node server that is managed by a load balancing server array controller may not always share the same state relationship with the client that is saved in the Cookie. In this case, the controller must persistently send a repeated client HTTP request to the same node server because it is difficult to recreate the same state relationship in another server during the HTTP request/response session.

Although the saved state relationship in a Cookie can create a load balancing problem, the present invention uses the Cookie mechanism to offer a solution to this problem by enabling a network transmission device, e.g., a switch, Internet router, and/or a server array controller, to insert and/or examine Cookies in the data streams of HTTP connections for the purpose of reliably, conveniently and persistently directing connections to the same destination, e.g., a node server. Preferably, the network transmission device actively inserts data into or modifies the HTTP data stream from a server so that a Cookie can be saved by the client indicating the state relationship between the client and the server. In this way, the transmission device can use the Cookie returned in a subsequent client HTTP request to direct the current connection to the same server.

System Overview

FIG. 1A illustrates a system overview 100A of the data flow for an HTTP request/response for accessing resources associated with a domain name resolved into an Internet protocol (ip) address or an ip address that is directly provided by a client 10. In this example, the client 10 starts a session by connecting with an ISP 102 (located in Chicago, Ill.) over a communication medium. For example, the client may connect to the local ISP through a telephone modem, cable modem and/or satellite connection. The local ISP 102 usually provides a local domain name system (DNS) server 106 that communicates with other servers on the WAN for resolving a domain name request into an ip address when the client provides a domain name for accessing resources.

The client 10 sends an HTTP request 108A to the local ISP 102 for access to resources associated with an ip address that is either resolved or directly provided. A proxy server 104 will assign and add its first available virtual client ip address to the HTTP request 108A, so that the client 10 is identifiable during the current .session. In the case where the HTTP request 108A identifies a domain name associated with the resource instead of an ip address, the local DNS server 106 employs a distributed database to resolve the domain name into the ip address for the requested resource.

The proxy server 104 sends the HTTP request 108A over the Internet 110 to a data center 112 located in Seattle, Wash., which is identified to be associated with the requested domain name ("domain. com") or ip address. A router 114, (optional) firewall 116, server array controller 118 and an intranet of N node servers 120 are disposed at the data center 112. The server array controller 118 is used to manage and load balance network traffic on the intranet of node servers 120.

In one embodiment, the server array controller 118 intelligently distributes web site connections across arrays (pools) of node servers, transparent firewalls, transparent cache servers, routers as well as other router-like devices. The controller 118 may manage connections to multiple Internet or intranet sites, and it can support a wide variety of Internet protocols and services such as TCP/IP (transmission control protocol/Internet protocol) and HTTP. It is understood that the TCP/IP protocol actually represents a suite of communications protocols that are used to connect hosts on the Internet.

Each node server is defined by a specific combination of a node address and a node port number on the intranet behind the server array controller 118 which can monitor several aspects of the node servers. The controller 118 can load balance each connection to the intranet of node servers by selecting a unique ip address for a node server to provide optimal access to a requested resource.

The selected node server will provide access to the requested resource in an HTTP response that is sent by the server array controller 118 over the Internet 110 to the virtual client ip address at the Local ISP 102. The HTTP response includes a SET COOKIE command in the header of the response which includes information identifying the actual node server on the intranet behind the server array controller 118. The client accesses the requested resource in the HTTP response received from the Local ISP 102.

Figure 1B:
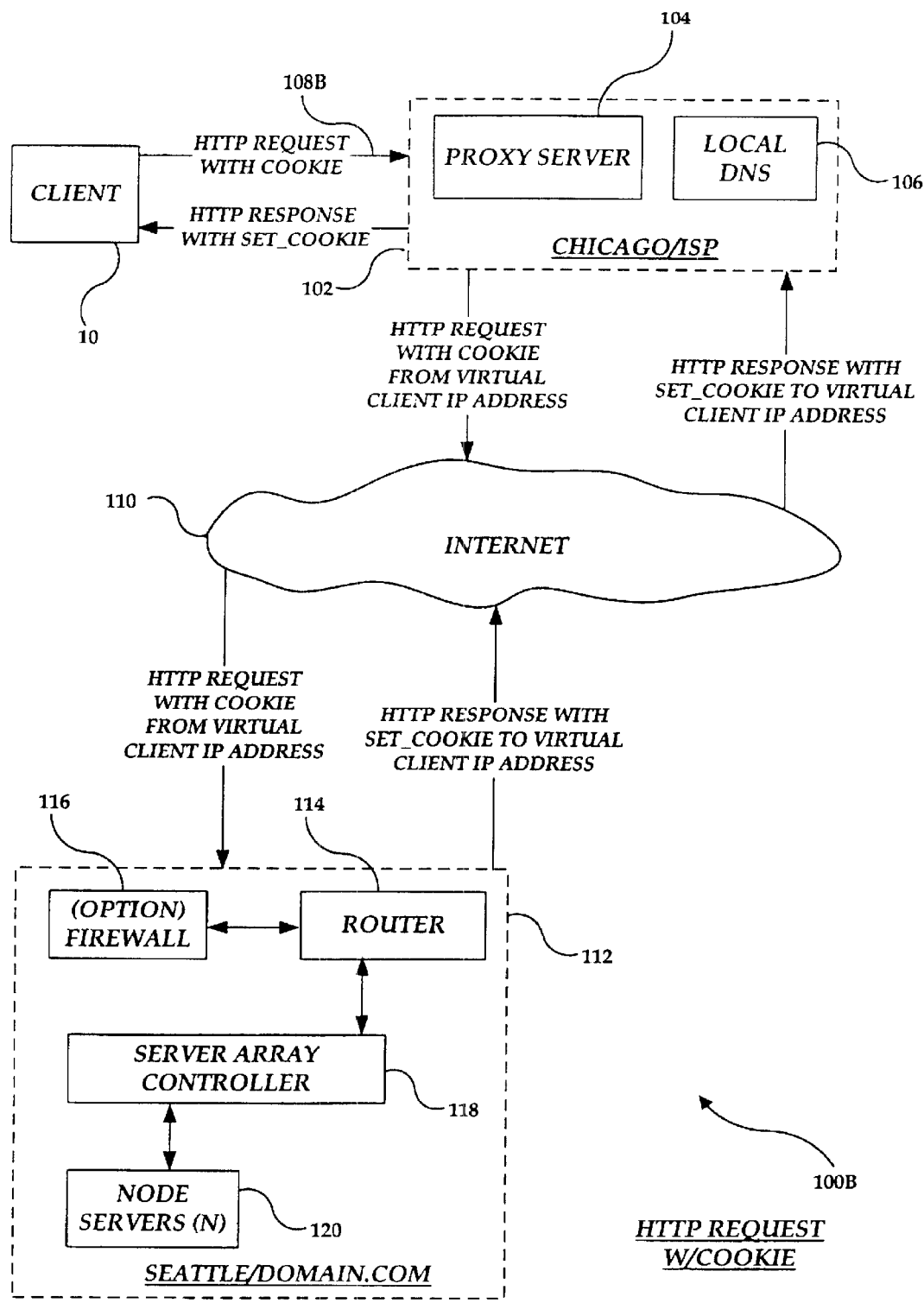
FIG. 1B is a schematic overview of a system for processing an HTTP request that does include a Cookie.

FIG. 1B illustrates a system overview 100B of substantially the same data stream flow as shown in FIG. 1A, except that the client 10 is providing an HTTP request 108B which includes a Cookie uniquely identifying a relationship between the previously selected node server and the client requesting access to the resource. So long as the Cookie is not expired, the server array controller 118 will automatically direct the HTTP request to the destination (node server) identified by the information in the Cookie. Thus, the server array controller 118 can use the information in the Cookie to reliably and efficiently load balance client demands for access to requested resources.

Logic Overview

Figure 2A:
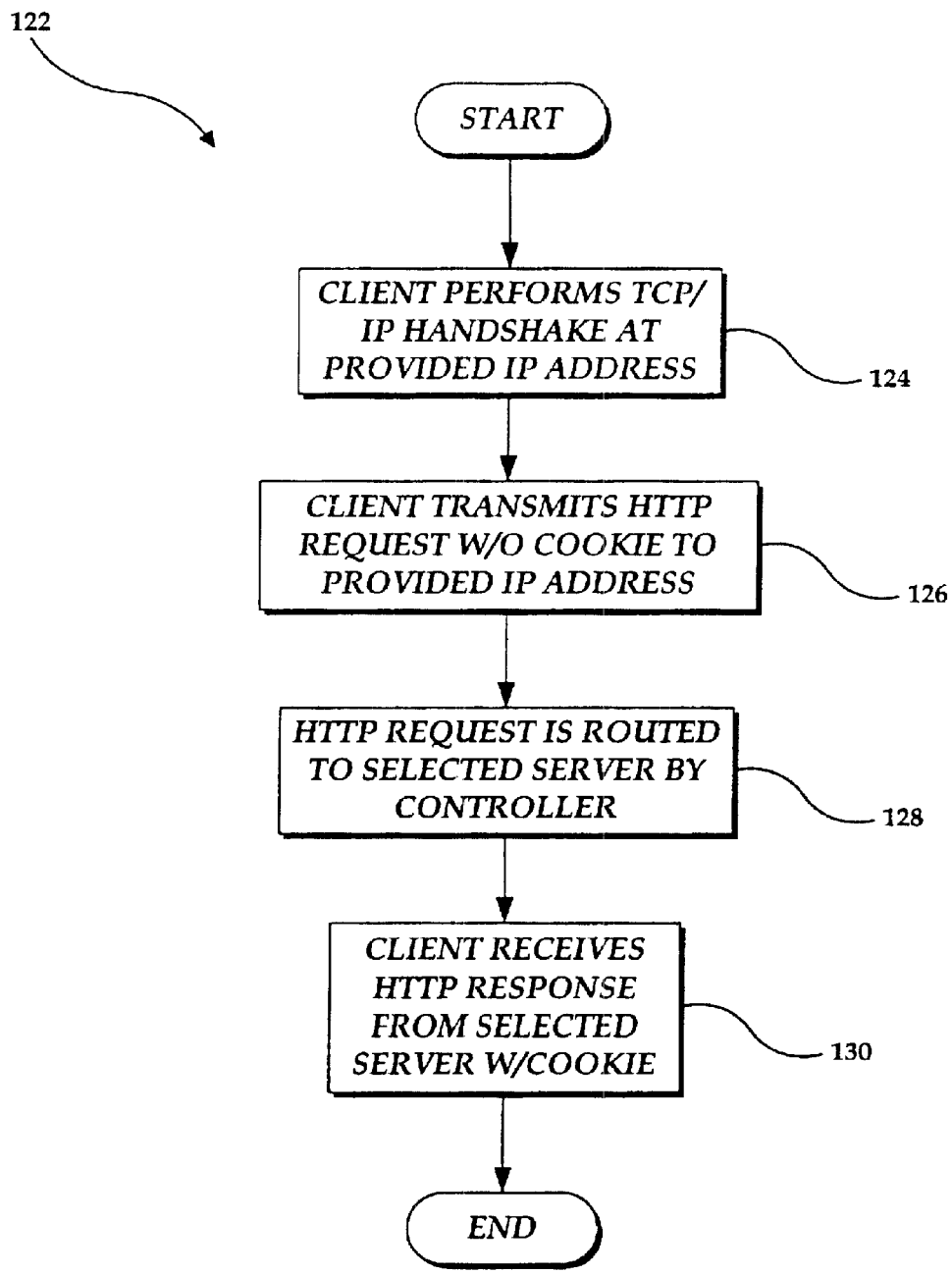
FIG. 2A is a flow chart showing an overview for processing an HTTP request that does not include a Cookie.

In FIG. 2A, an overview 122 is shown of the general logic flow for an HTTP request that does not include a Cookie identifying the actual node server that will provide access to the requested resource. Moving from a start block, the logic steps to a block 124 where a TCP/IP handshake is performed between the client 10 and the server array controller 118 at the ip address provided by the client. Advancing to a block 126, the client 10 transmits the HTTP request to the server array controller 118 without a Cookie identifying the node server that will provide access to the requested resource.

Flowing to a block 128, the server array controller 118 makes a load balancing determination and selects the optimal node server to provide access to the requested resource and routes the HTTP request to the selected node server. The server array controller 118 may employ any one of several different types of load balancing methods to analyze metric information and optimally balance client HTTP requests (load demand). These load balancing methods include round trip time, round robin, least connections, packet completion rate, quality of service, server array controller packet rate, topology, global availability, hops, static ratio and dynamic ratio.

Stepping to a block 130, the selected node server generates an HTTP response that enables the client 10 to access the requested resource. The selected node server transmits the generated HTTP response to the server array controller 118 which retransmits the response to the client 10 along with information included with a SET COOKIE command that enables the particular ip address of the selected node server to be identified. Depending upon the mode of the present invention that is selected, the SET COOKIE command may be inserted in the header of the HTTP response by the server array controller 118 and/or the selected node server. Next, The logic moves to an end block and terminates.

Figure 2B:
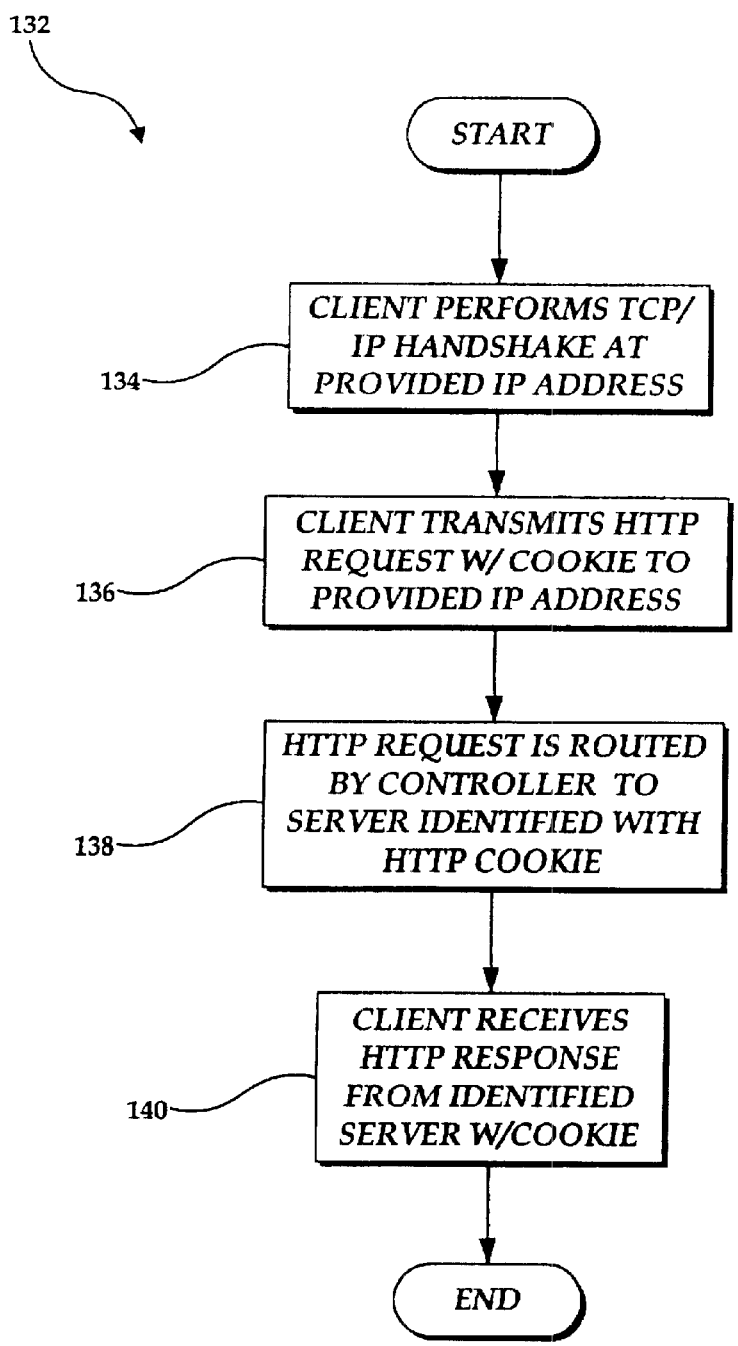
FIG. 2B is a flow chart illustrating an overview for processing an HTTP request that does include a Cookie.

FIG. 2B shows an overview 132 for processing an HTTP request that includes a Cookie with information that can be used to identify the destination that was previously selected to provide access to the requested resources. Moving from a start block, the logic steps to a block 134 where a TCP/IP handshake is performed between the client 10 and the server array controller 118 associated with the node server identified in the Cookie. Advancing to a block 136, the client 10 transmits the HTTP request to the server array controller 118 along with the Cookie and its information. The logic flows to a block 138 where the server array controller 118 uses the information included in the Cookie to route the HTTP request directly to the ip address of the node server that was previously selected to provide access to the requested resources.

Next, the logic moves to a block 140 where the selected node server generates an HTTP response for accessing the requested resources and provides this HTTP response to the server array controller 118. The controller 118 retransmits the HTTP response to the client 10 along with a SET COOKIE command that includes information that can be used to identify a relationship between the client and the destination (node server) that will provide access to the requested resources. The logic moves to an end block and terminates. The present invention thus enables the server array controller 118 to use the information in the Cookie to quickly, reliably and efficiently load balance client demands for access to requested resources.

Although not shown, another embodiment of the present invention enables the server array controller 118 to vary the expiration date of the time stamp included with HTTP requests and responses. When the load demand on the server array controller 118 increases, the controller may increase the period of time (expiration date) before the time stamp expires. Alternatively, when the load on the server array controller 118 decreases, the controller may decrease the period of time before the time stamp expires. By varying the expiration dates of the time stamps, the server array controller 118 may control the number of times that the controller performs load balancing determinations within a period of time. Also, when only a few destinations can provide access to the requested resource, the server array controller 118 may set the time stamp expiration date to one year or more.

The present invention provides at least four different modes of operation for inserting information in an HTTP response and examining Cookies in an HTTP request for uniquely identifying a relationship between the client and a selected destination such as a node server to provide access to the requested resources. These modes of operation include associative, passive, rewrite and insert.

Associative Mode

Figure 3A:
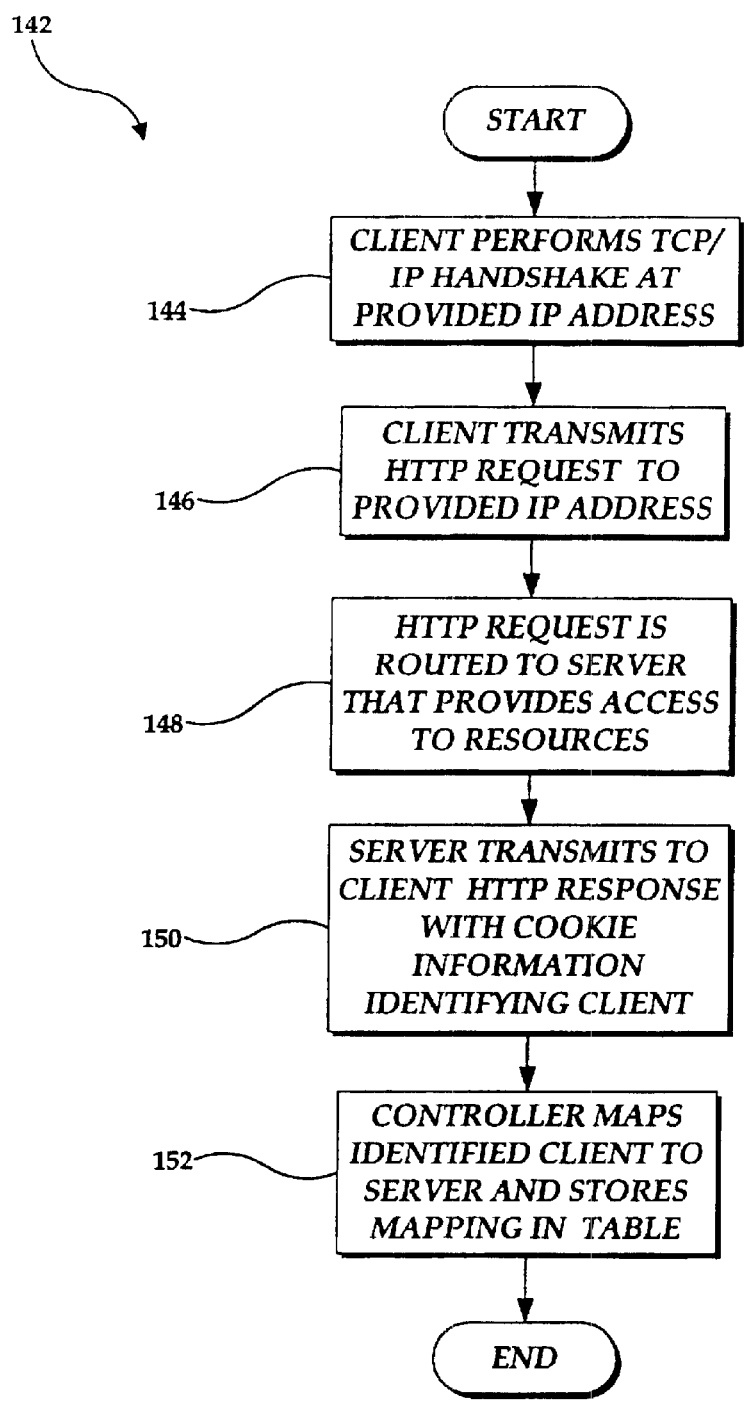
FIG. 3A is a flow chart showing an associative mode for processing an HTTP request that does not include a Cookie.

In FIG. 3A, an overview 142 of an "associative" mode for processing an HTTP response without a Cookie is illustrated. Moving from a start block, the logic steps to a block 144 where a TCP/IP handshake is performed between the client 10 and the server array controller 118 at the ip address provided by the client. Advancing to a block 146, the client 10 transmits the HTTP request to the server array controller 118.

The logic flows to a block 148 where the server array controller 118 receives the HTTP request and makes a load balancing determination to select the optimal node server to provide access to the requested resource. After selecting the optimal node server, the server array controller 118 routes the HTTP request to the selected node server.

The logic steps to a block 150 where the selected node server generates an HTTP response that provides access to the requested resource. The selected node server transmits the HTTP response to the server array controller 118. The server array controller 118 inserts a SET COOKIE command with information uniquely identifying the client 10 into the HTTP response's header. The controller 118 retransmits the HTTP response and the Cookie information to the client 10.

Alternatively, the selected node server may include the SET COOKIE command in the HTTP response's header with blank information. In this case, the server array controller 118 rewrites this blank information with information that uniquely identifies the client 10 and retransmits the "rewritten" HTTP response to the client.

Next, the logic flows to a block 152 where the server array controller 118 maps the identified client and the ip address of the selected node server into a table that is stored in the memory of the controller. The logic moves to an end block and terminates. Additionally, it is understood that the SET COOKIE command causes the client to store the Cookie information that uniquely identifies the client, so that when the same HTTP request is repeated by the client, this stored Cookie information will be used to create a Cookie that is included with the repeated HTTP request.

Figure 3B:
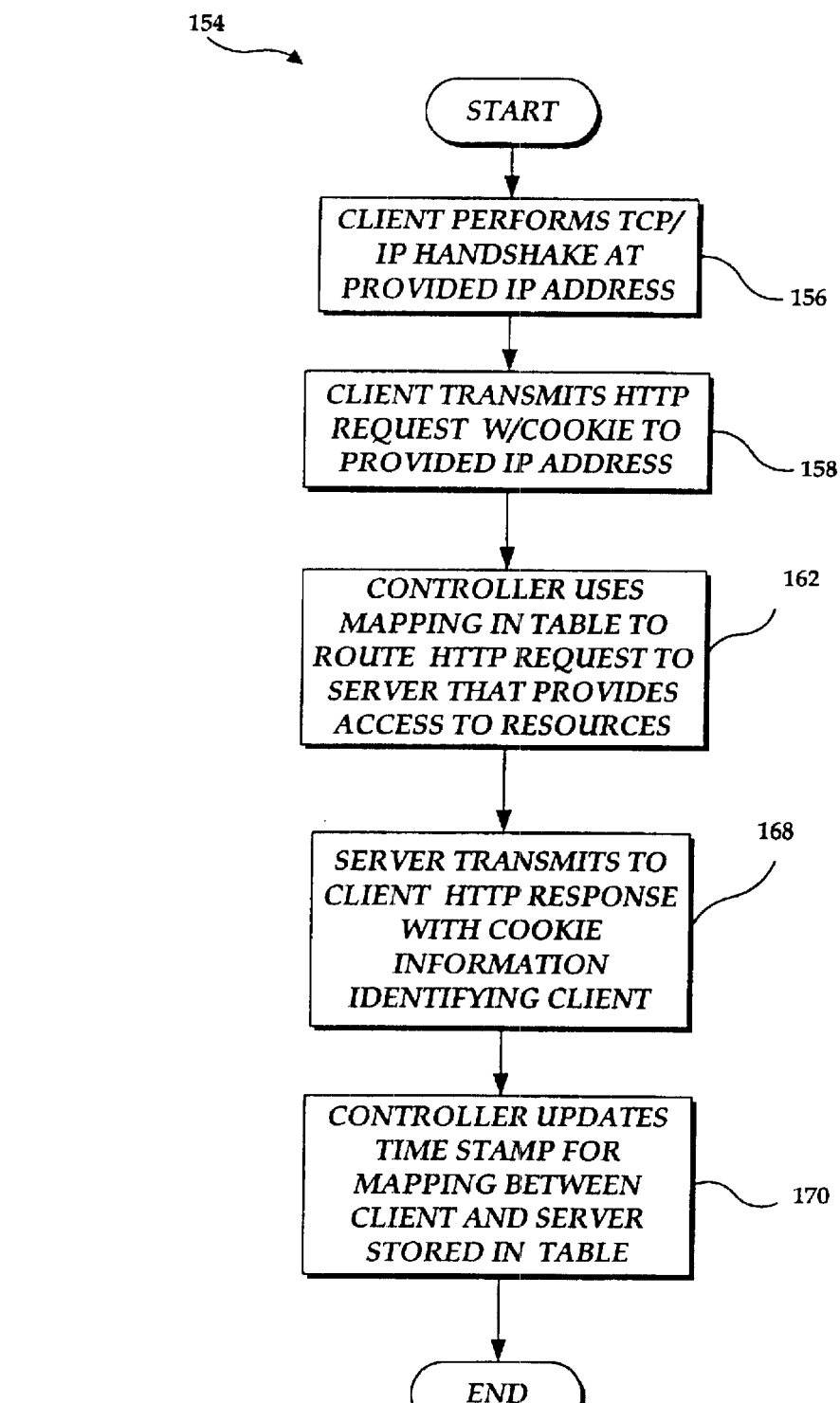
FIG. 3B is a flow chart illustrating an associative mode for processing an HTTP request that does include a Cookie.

FIG. 3B shows an overview 154 of an "associative" mode for processing an HTTP request that includes a Cookie with information that can be used to identify the client 10. The Cookie for an HTTP request may be provided from a previous HTTP request/response exchange as illustrated in FIG. 3A above. It is also envisioned that another facility may be employed to create a Cookie for the HTTP request that includes information identifying the client 10. In this example, the information included in the Cookie enables the server array controller 118 to uniquely identify the client 10 and a mapped relationship to a previously selected node server. Moving from a start block, the logic steps to a block 156 where a TCP/IP handshake is performed between the client 10 and the server array controller 118 at an ip address provided by the client. Advancing to a block 158, the HTTP request along with the Cookie is transmitted from the client 10 to the server array controller 118.

The logic will move to a block 162 where the server array controller 118 will access the table held in its memory and identify the mapped relationship between the client and the previously selected node server for accessing the requested resources. Using the mapped relationship in the table, the controller 118 will provide the HTTP request to the previously selected node server. The logic flows to a block 168 where the node server generates an HTTP response which includes a SET COOKIE command with information that can be used to uniquely identify the client 10 requesting access to the resources at the ip address of the selected node server. The logic moves to a block 170 where the server array controller 118 updates another time stamp stored in the table which is associated with the mapping of the relationship between the client and the selected node server. Next, the logic moves to an end block and terminates.

Alternatively, in another embodiment, the node server could include a SET COOKIE command with blank information in the generated HTTP response. In this case, the server array controller 118 would rewrite the blank information to include other information that uniquely identifies the client 10 requesting access to the resources at the ip address of the selected node server.

In summary, the associative mode provides for inserting a Cookie into an HTTP response that uniquely identifies the client so that when a client's subsequent HTTP request is compared to a table, this subsequent HTTP request will be provided to a previously selected destination. The present invention thus enables the server array controller 118 to use the information in the Cookie to load balance client demands for access to requested resources. Additionally, it is understood that the associative mode puts most of the load for processing an HTTP request on the server array controller 118 relative to the load placed on a previously selected node server that is managed by the controller.

Figure 4A:
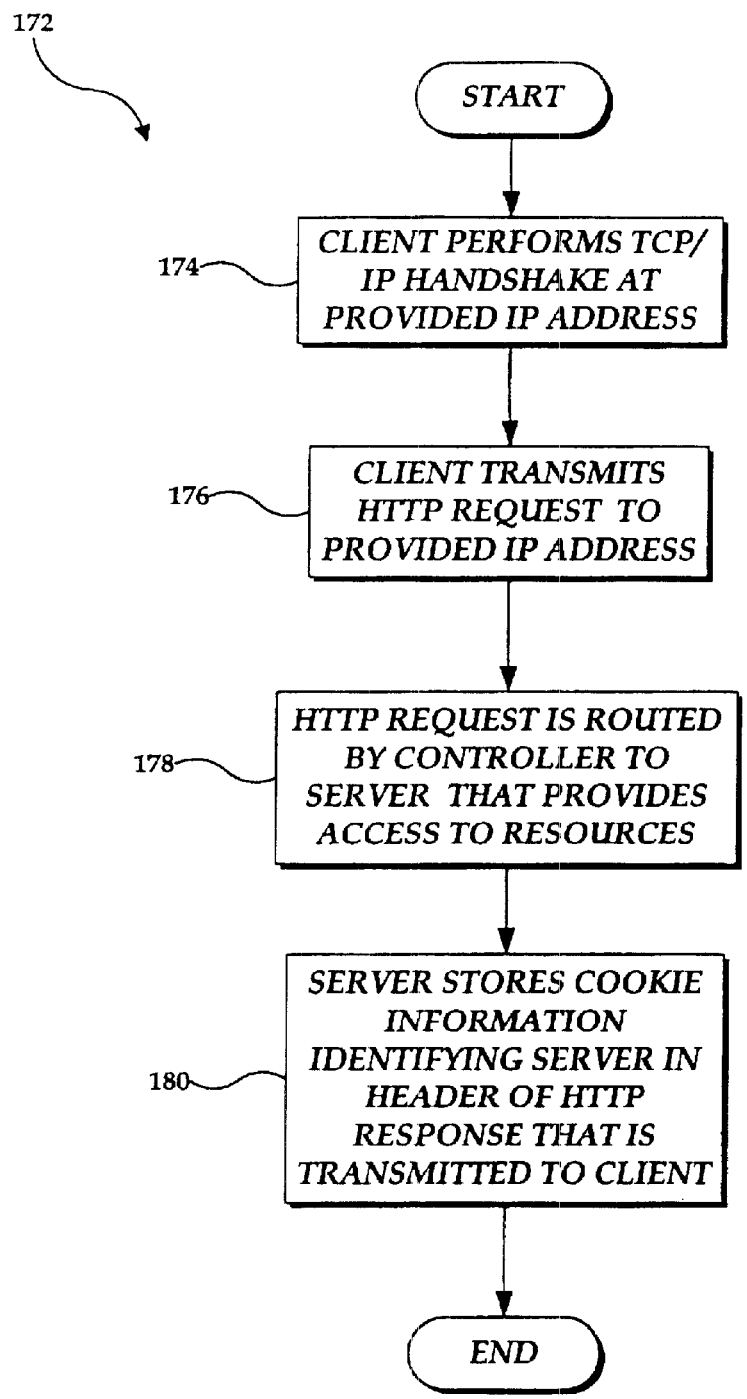
FIG. 4A is a flow chart showing a passive mode for processing an HTTP request that does not include a Cookie.

Passive Mode In FIG. 4A, an overview 172 of a "passive" mode for processing an HTTP request/response is illustrated. Moving from a start block, the logic steps to a block 174 where a TCP/IP handshake is performed between the client 10 and the server array controller 118 at the ip address provided by the client. Advancing to a block 176, the client 10 transmits the HTTP request to the server array controller 118.

The logic flows to a block 178 where the server array controller 118 receives the HTTP request and makes a load balancing determination to select the optimal node server to provide access to the requested resource. After selecting the optimal node server, the server array controller 118 provides the HTTP request to the selected node server. The logic steps to a block 180 where the selected node server generates an HTTP response that includes Cookie information identifying the selected node server, i.e., a SET COOKIE command is inserted into the header of the HTTP response. The selected node server provides the HTTP response along with the inserted Cookie information to the server array controller 118. The server array controller 118 provides the HTTP response with the Cookie information to the client 10. Next, the logic moves to an end block and terminates.

Additionally, it is understood that the SET COOKIE command causes the client to store Cookie information that identifies the previously selected destination, e.g., a node server, so that when the same HTTP request is repeated by the client, this stored Cookie information will be used to create a Cookie that is included with the repeated HTTP request.

Figure 4B:
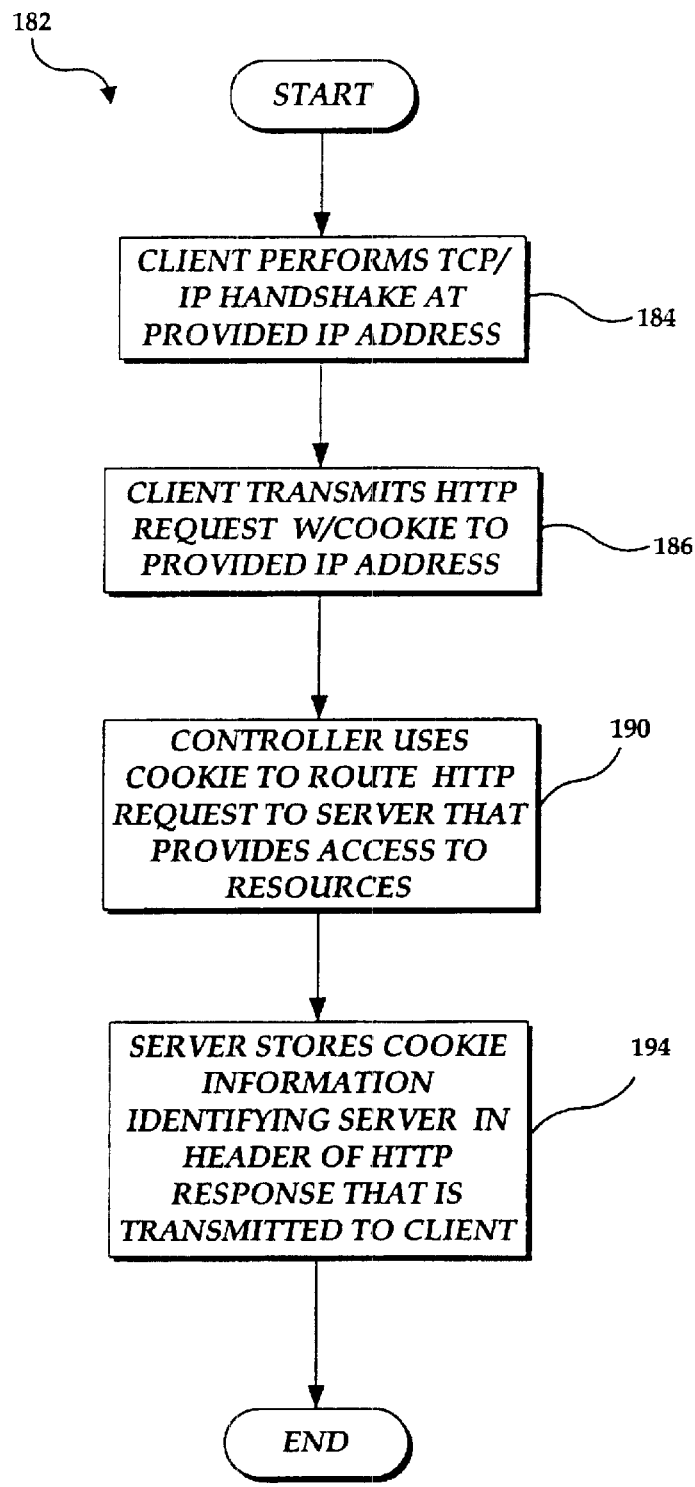
FIG. 4B is a flow chart illustrating a passive mode for processing an HTTP request that does include a Cookie.

FIG. 4B shows an overview 182 of a "passive" mode for processing an HTTP request that includes a Cookie with information identifying a previously selected node server for providing access to requested resources. Moving from a start block, the logic steps to a block 184 where a TCP/IP handshake is performed between the client 10 and the server array controller 118 at the ip address provided by the client. Advancing to a block 186, the HTTP request along with the Cookie is transmitted from the client 10 to the server array controller 118.

The logic moves to a block 190 where the server array controller 118 will use the information included in the Cookie to provide the HTTP request to the previously selected node server. The logic steps to a block 194 where the selected node server generates an HTTP response including Cookie information that identifies the selected node server. The selected node server provides the HTTP response with the Cookie information to the server array controller 118. The server array controller 118 retransmits the HTTP response with the Cookie information to the client 10. Next, the logic moves to an end block and terminates.

In summary, the passive mode provides for inserting Cookie information into an HTTP response that uniquely identifies a previously selected destination, such as a node server, so that when a client's subsequent HTTP request is examined, it can be efficiently provided to the previously selected destination. The present invention thus enables the server array controller 118 to use the information in the Cookie to load balance client demands for access to requested resources. Also, the passive mode puts most of the load for processing an HTTP request on a node server relative to the load placed on a server array controller 118 managing the node server.

Rewrite Mode

Figure 5A:
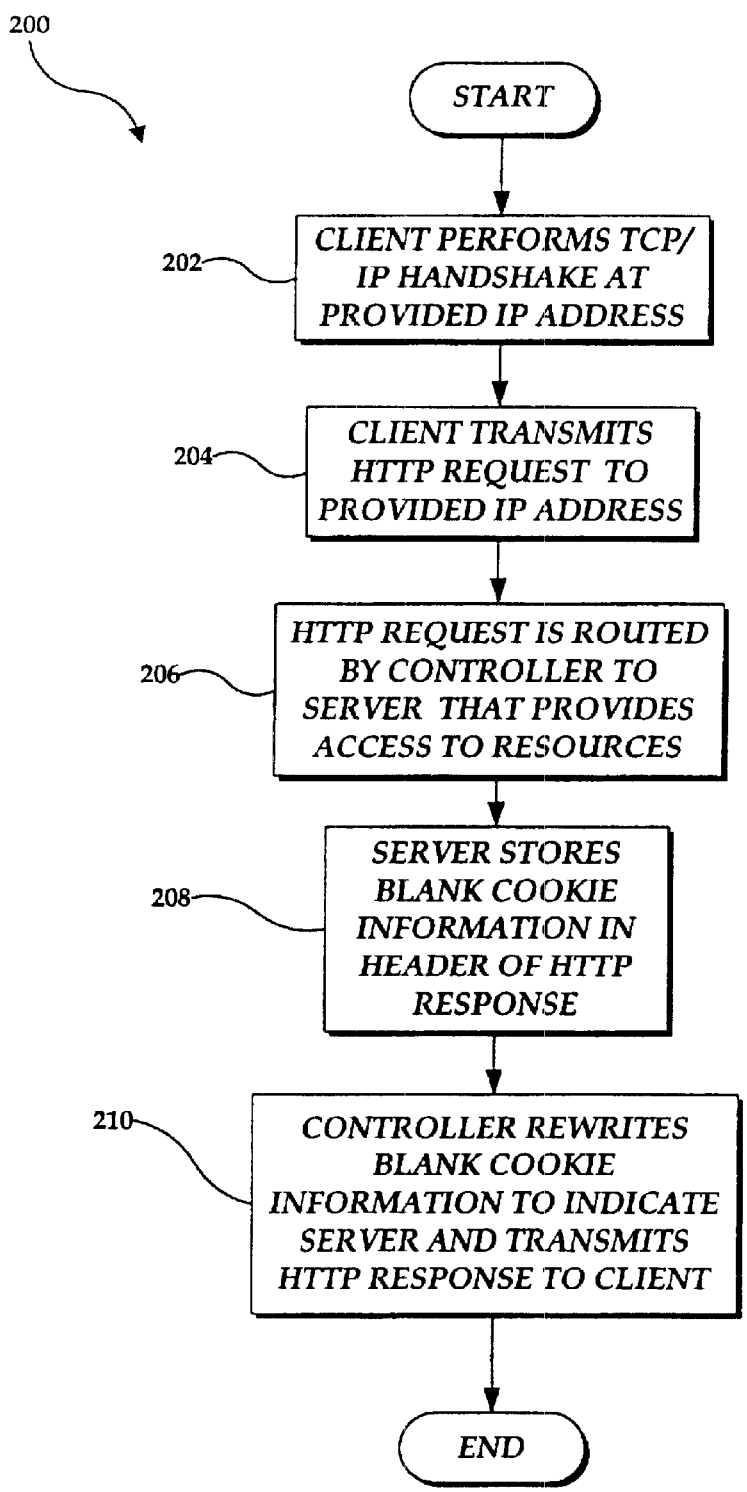
FIG. 5A is a flow chart showing a rewrite mode for processing an HTTP request that does not include a Cookie.

In FIG. 5A, an overview 200 of a "rewrite" mode for processing an HTTP response is illustrated. Moving from a start block, the logic steps to a block 202 where a TCP/IP handshake is performed between the client 10 and the server array controller 118 at the ip address provided by the client. Advancing to a block 204, the client 10 transmits the HTTP request to the server array controller 118.

The logic flows to a block 206 where the server array controller 118 receives the HTTP request and makes a load balancing determination to select the optimal node server to provide access to the requested resource. After selecting the optimal node server, the server array controller 118 routes the HTTP request to the selected node server. The logic steps to a block 208 where the selected node server generates an HTTP response that includes blank Cookie information, i.e., a SET COOKIE command is inserted into the header of the HTTP response without information identifying the selected node server. The selected node server provides the HTTP response with the blank Cookie information to the server array controller 118. The logic moves to a block 210 where the controller 118 rewrites the blank Cookie information to identify the node server selected to provide access to the requested resources. The server array controller 118 transmits the HTTP response and the rewritten Cookie information to the client 10. Next, the logic moves to an end block and terminates.

Figure 5B:
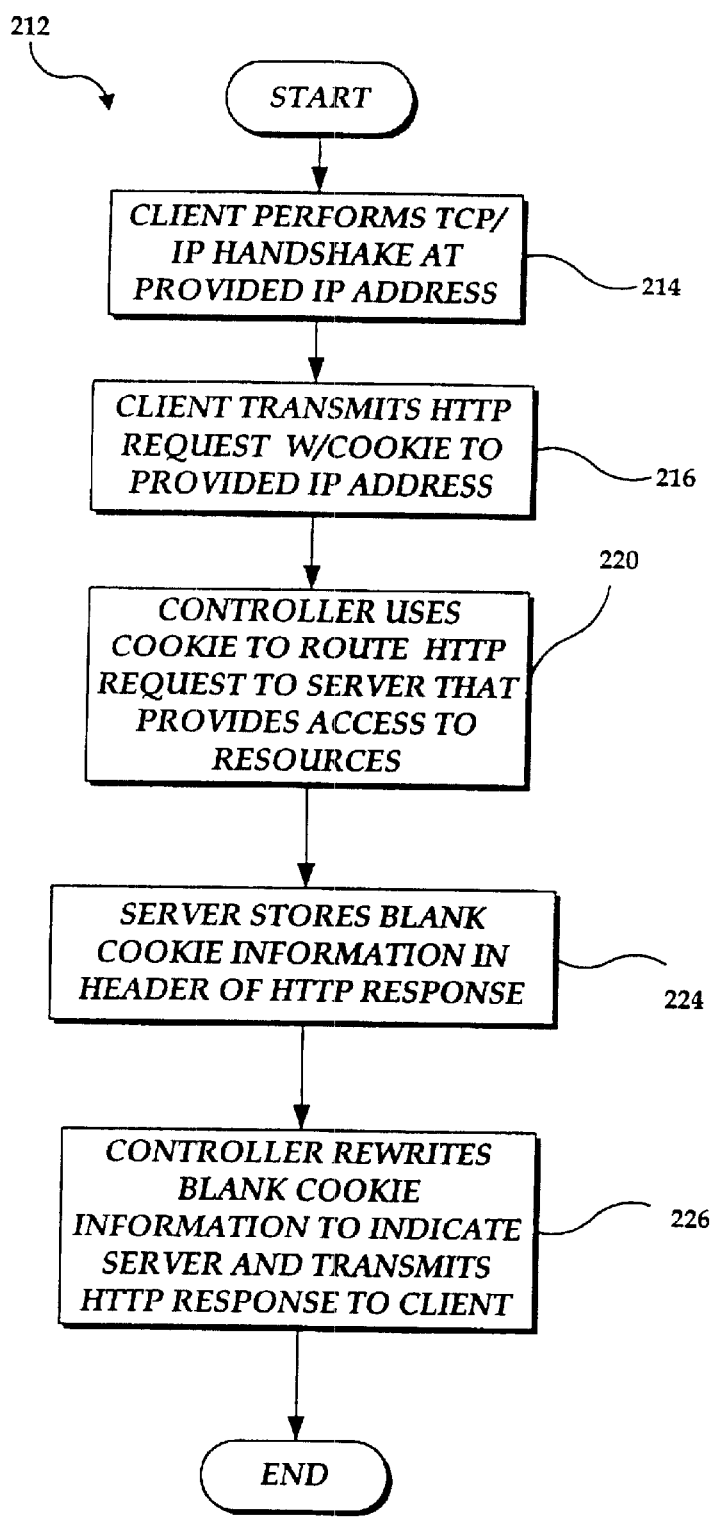
FIG. 5B is a flow chart illustrating a rewrite mode for processing an HTTP request that does include a Cookie.

FIG. 5B shows an overview 212 of a "rewrite" mode for processing an HTTP request that includes a Cookie with information for identifying a node server previously selected to provide access to the requested resources. Moving from a start block, the logic steps to a block 214 where a TCP/IP handshake is performed between the client 10 and the server array controller 118 at an ip address provided by the client. Advancing to a block 216, the HTTP request along with the Cookie is transmitted from the client 10 to the server array controller 118.

The logic will move to a block 220 where the server array controller 118 will use the information included in the Cookie to identify the previously selected node server and route the HTTP request to this node server. The logic steps to a block 224 where the selected node server generates an HTTP response that includes blank Cookie information. The selected node server provides the HTTP response along with the inserted blank Cookie information to the server array controller 118. The logic steps to a block 226 where the server array controller 118 rewrites the blank Cookie information to include other information that identifies the selected node server. Next, the logic moves to an end block and terminates.

In the rewrite mode, the server array controller 118 manages the other "destination" information that is rewritten over the blank Cookie information. The rewrite mode roughly divides the load for processing an HTTP request/response between a server array controller 118 and a selected node server that is managed by the controller. The rewrite mode places a portion of this load on the selected node server to insert the blank Cookie in an HTTP response and another portion of this load on a server array controller 118 for rewriting the blank Cookie information to include other information that identifies the selected destination (node server). One advantage of the rewrite mode is that a plurality of node servers managed by the server array controller 118 may have the same content related to inserting blank Cookie information into an HTTP response. In this way, updates to the plurality of node servers are more easily provided because each node server can have the same content. Also, since the other information identifying the destination will occupy the same space as the blank Cookie information that was written over, the actual data packet containing the HTTP response does not have to change in size.

Insert Mode

Figure 6A:
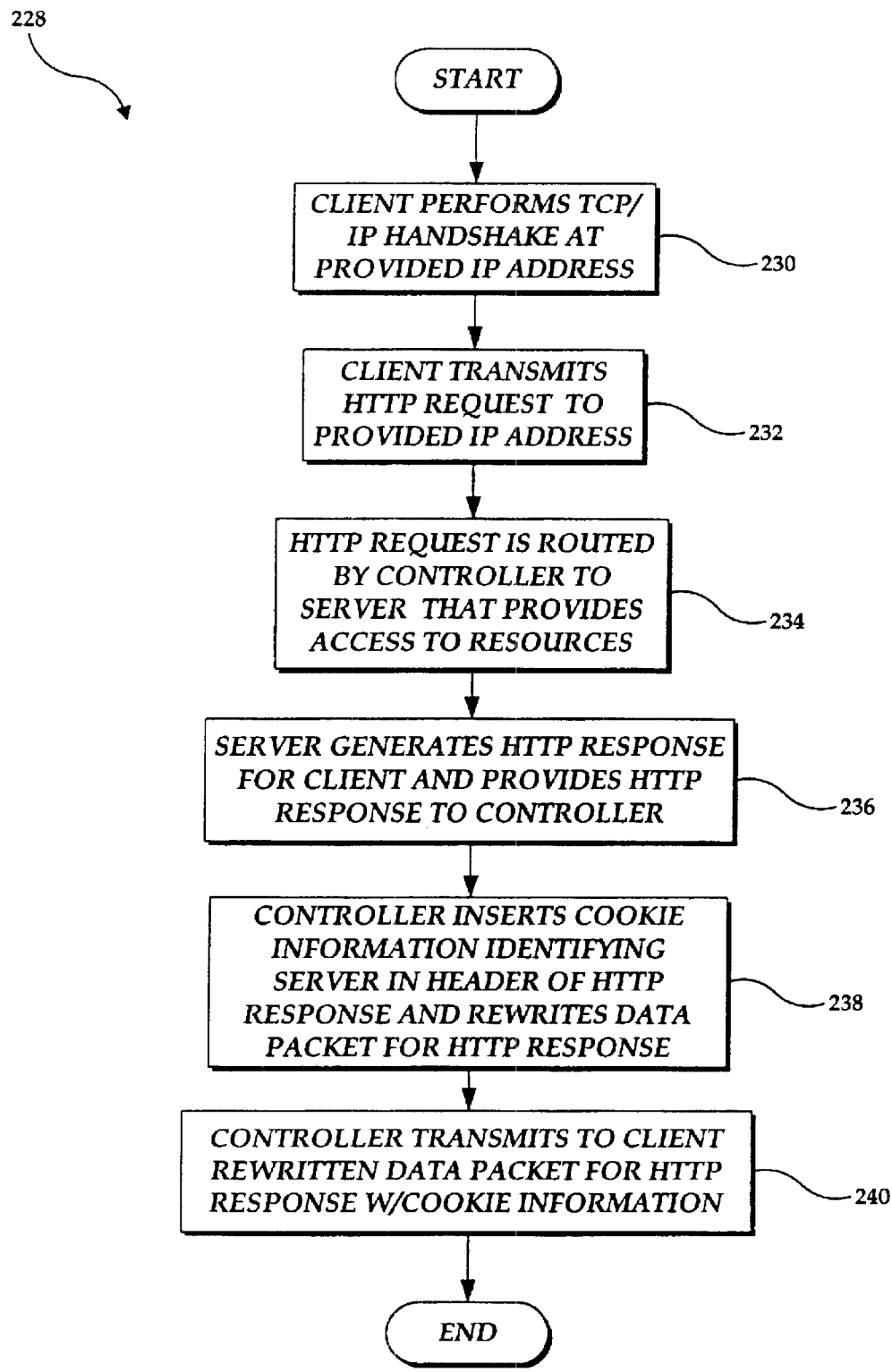
FIG. 6A is a flow chart showing an insert mode for processing an HTTP request that does not include a Cookie.

In FIG. 6A, an overview 228 of an "insert" mode for processing an HTTP request/response is illustrated. Moving from a start block, the logic steps to a block 230 where a TCP/IP handshake is performed between the client 10 and the server array controller 118 at the ip address provided by the client. Advancing to a block 232, the client 10 transmits the HTTP request to the server array controller 118 at the primary ip address.

The logic flows to a block 234 where the server array controller 118 receives the HTTP request and makes a load balancing determination to select the optimal node server to provide access to the requested resource. The server array controller 118 provides the HTTP request to the selected node server. The logic steps to a block 236 where the selected node server generates an HTTP response and provides the generated HTTP response to the server array controller 118. The logic moves to a block 238 where the server array controller 118 rewrites the data packet(s) containing the HTTP response so that Cookie information identifying the node server selected to provide access to the requested resources can be inserted into the data packet. The logic flows to a block 240 where the server array controller 118 provides to the client 10 the rewritten data packet that includes the HTTP response and the inserted Cookie information. Next, the logic moves to an end block and terminates.

Figure 6B:
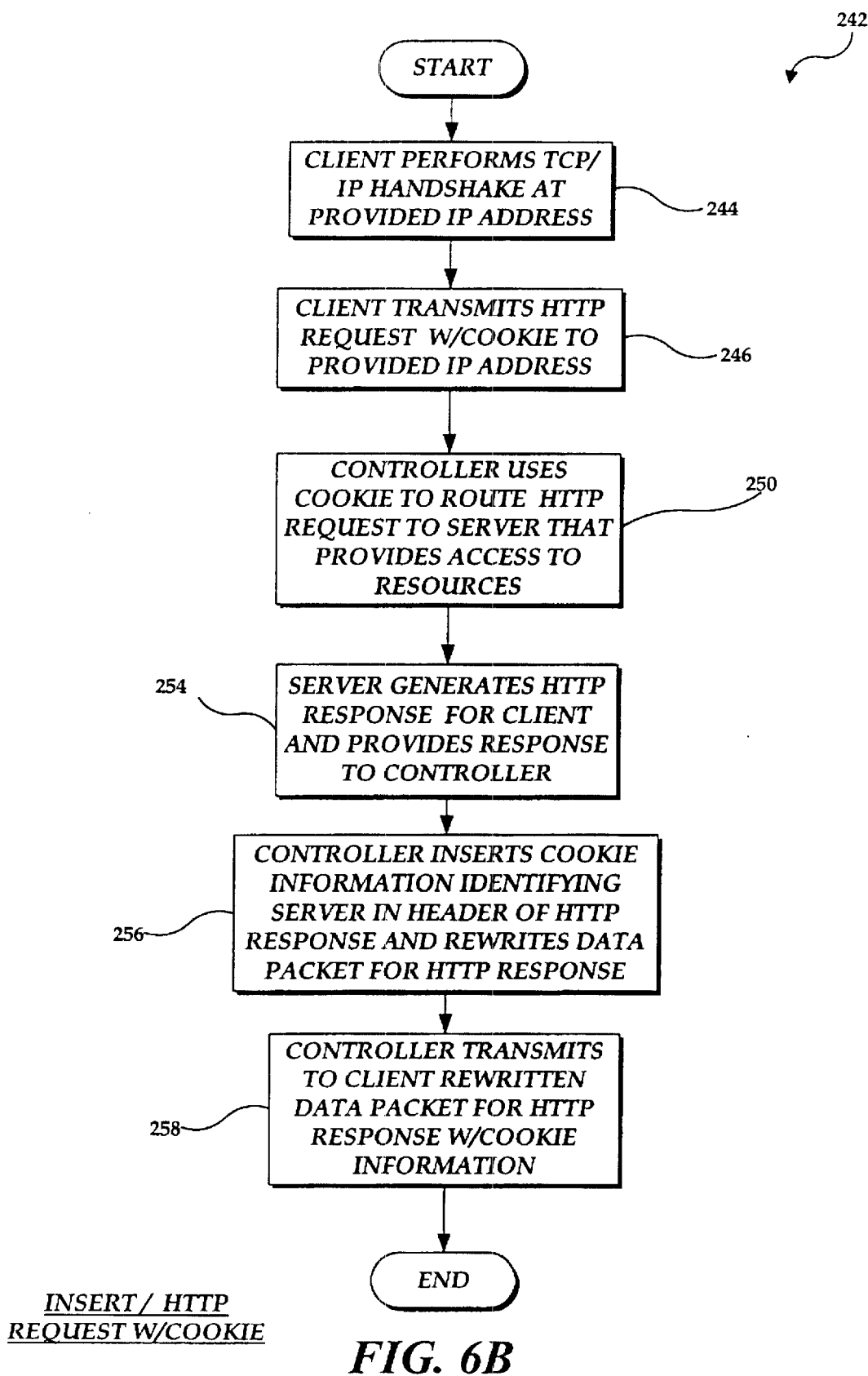
FIG. 6B is a flow chart illustrating an insert mode for processing an HTTP request that does include a Cookie.

FIG. 6B shows an overview 242 of an "insert" mode for processing an HTTP request that includes a Cookie with information identifying a node server previously selected to provide access to the requested resources. Moving from a start block, the logic steps to a block 244 where a TCP/IP handshake is performed between the client 10 and the server array controller 118 at an ip address provided by the client. Advancing to a block 246, the HTTP request along with the Cookie is transmitted from the client 10 to the server array controller 118.

The logic will move to a block 250 where the server array controller 118 will use the information included in the Cookie to identify the previously selected node server. The server array controller 118 will rewrite the data packet(s) containing the HTTP response. The server array controller 118 will provide the rewritten data packet(s) containing the HTTP response to the client 10. The logic steps to a block 254 where the selected node server generates an HTTP response and provides the HTTP response to the server array controller 118. The logic moves to a block 256 where the server array controller 118 rewrites the data packet(s) containing the HTTP response to insert Cookie information into the response's header for identifying the node server selected to provide access to the requested resources. The logic flows to a block 258 where the server array controller 118 transmits to the client 10 a rewritten data packet that includes the HTTP response and the newly inserted Cookie information. Next, the logic moves to an end block and terminates.

The insert mode enables a server array controller 118 to load balance client demands for access to requested resources by inserting and removing Cookie information in the data packets for HTTP requests and responses prior to processing by the destination (selected node server). In the insert mode, all of the load for inserting and examining Cookie information and rewriting data packets is placed on the server array controller 118 and none of this load is put on the node servers managed by the controller.

Exemplary Cookie Code Fragments

In FIGS. 7A–7E, exemplary embodiments of HTML code fragments are shown that illustrate Cookie information included with an HTTP request/response. FIG. 7A shows an exemplary code fragment for an HTTP request 260 that includes Cookie information identifying a server that previously provided access to the requested resources. FIG. 7B illustrates an exemplary code fragment for an HTTP request 262 that contains blank Cookie information that does not identify the client 10 or a previously selected destination such as a node server. FIG. 7C shows an exemplary code fragment for an HTTP request 264 that includes Cookie information identifying the client 10 that previously requested access to the requested resources. FIG. 7D illustrates an exemplary code fragment for an HTTP response 266 that includes Cookie information identifying a server that previously provided access to the requested resources. FIG. 7E shows an exemplary code fragment for an HTTP response 267 that includes Cookie information identifying the client requesting access to the resources provided by the server.

Proxy Server Buffering

Figure 8:
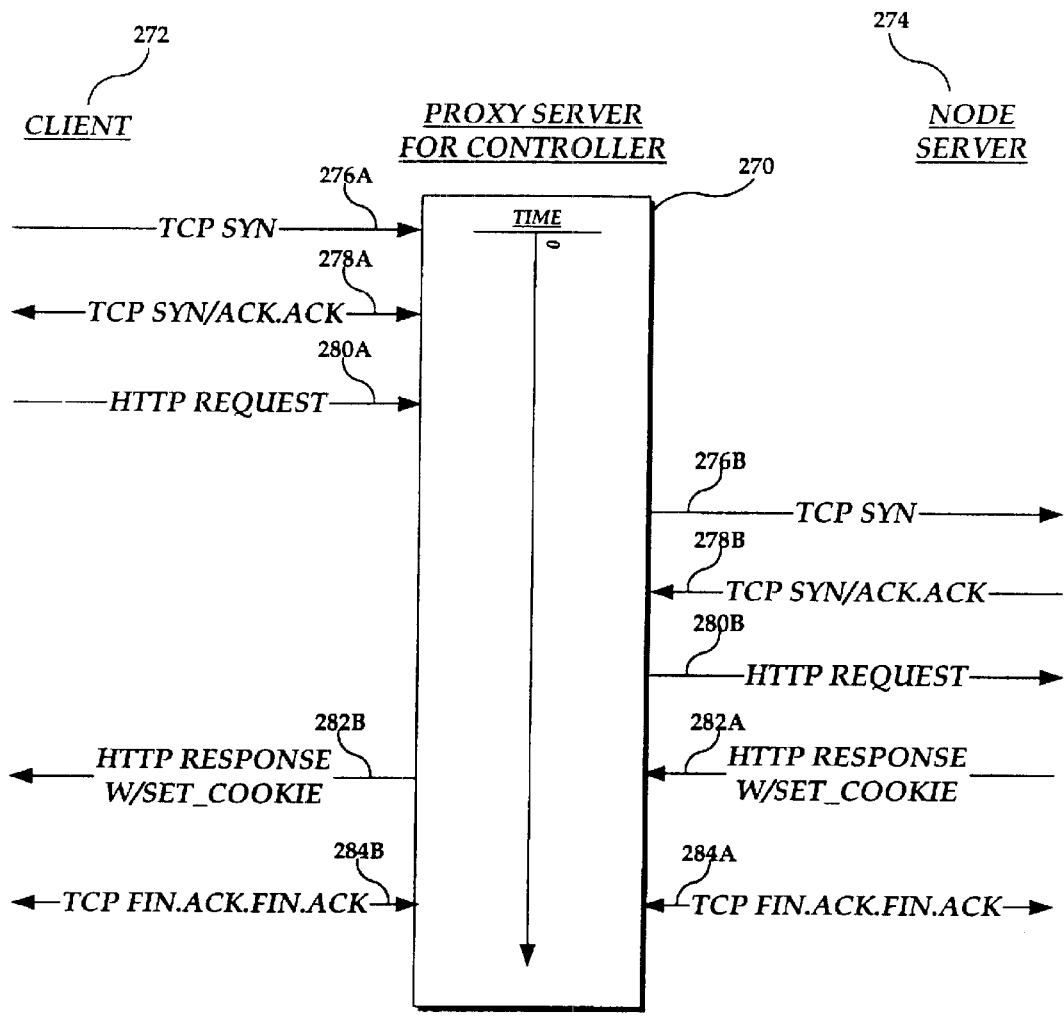
FIG. 8 shows the buffering of communication between a client and a node server by a proxy server.
Figure 8:
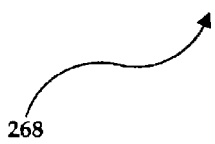

FIG. 8 illustrates an overview of how certain data packets between the client and a selected node server 274 are buffered and replayed by a server array controller's proxy server 270. A rectangular graphical representation of the proxy server 270 is vertically disposed along the center portion of this figure. Also, positioned along the center line of the developed length of the proxy server 270 is a time line 271 that starts with an initial value of "zero" near the top of the graphical representation of the proxy server. On the left side of the proxy server 270 is a graphical representation of a client 272 transmitting and receiving data packets along the developed length (and time line 271) of the proxy server. Similarly on the right side of the proxy server 270 is a graphical representation of a node server 274 transmitting and receiving data packets along the developed length of the proxy server.

Starting at the top left side of the figure, the client 10 is transmitting and receiving three separate groups of data packets with the proxy server 270. First, a TCP SYN 276A data packet is transmitted from the client 272 to the proxy server 270, which is followed by an exchange of TCP SYN/ACK.ACK 278A data packets. Next, an HTTP REQUEST 280A data packet is transmitted to the proxy server by the client.

All three groups of data packets are buffered and stored by the proxy server 270 until the HTTP REQUEST 280A is received by the proxy server. Then, the server array controller will examine the data packet(s) associated with the HTTP REQUEST 280A to determine if it includes Cookie information that identifies the client and/or a destination that previously provided access to the requested resources.

Once the Cookie determination is made, the proxy server 270 will sequentially replay the transmitting and receiving of the three groups of data packets with the selected node server 274. On the right side of the graphical representation of the proxy server 270, these three groups of data packets are replayed between the proxy server 270 and the node server 274. First, a TCP SYN 276B data packet is transmitted from the proxy server 270 to the node server 274, followed by an exchange of TCP SYN/ACK.ACK 278B data packets and next an HTTP REQUEST 280B data packet is transmitted to the node server 274 by the proxy server 270.

Moving further down the length of the graphical representation of the proxy server 270, a data packet(s) for an HTTP RESPONSE 282A is provided to the proxy server 270 by the selected node server 274. The proxy server 270 immediately replays this data packet to the client 272 in HTTP RESPONSE 282B. Next, the client 272 exchanges TCP FIN.ACK.FIN.ACK 284B data packets with the proxy server 270. The proxy server 270 immediately replays these data packets to the node server 274 as TCP FIN.ACK.FI-N.ACK 284A data packets.

It is important to note that the present invention only employs the proxy server 270 to buffer and store data packets until the HTTP request is received. Once the HTTP request is received, the proxy server will replay all of the buffered data packets for the selected node server 274 and switch to a forwarding mode for subsequent data packets, i.e., the proxy server will immediately replay all subsequent data packets transmitted by the client 272 to the selected node server.

System Configuration

Figure 9:
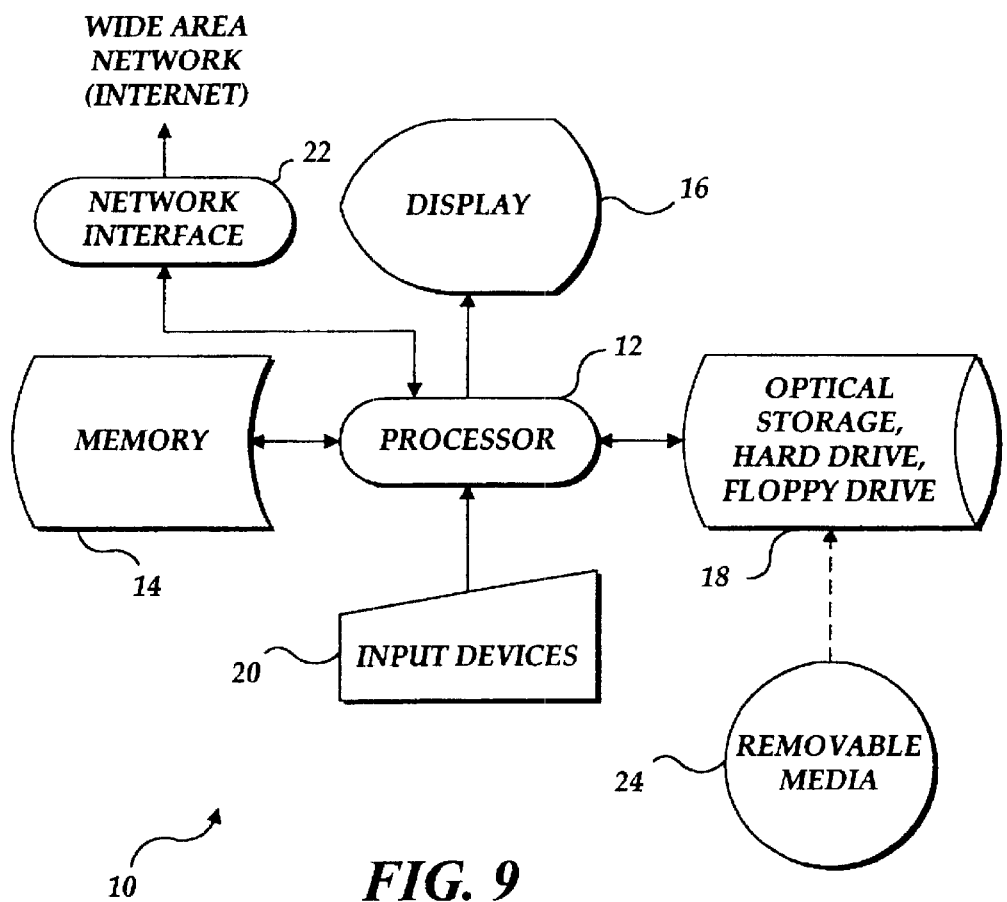
FIG. 9 illustrates an exemplary computer system for the client.

FIG. 9 illustrates a system for the client 10 comprising components of a computer suitable for executing an application program embodying the present invention. In FIG. 5, a processor 12 is coupled bi-directionally to a memory 14 that encompasses read only memory (ROM) and random access memory (RAM). ROM is typically used for storing processor specific machine code necessary to bootup the computer comprising client 10, to enable input and output functions, and to carry out other basic aspects of its operation. Prior to running any application program, the machine language code comprising the program is loaded into RAM within memory 14 and then executed by processor 12. Processor 12 is coupled to a display 16 on which the visualization of the HTML response discussed above is presented to a user. Often, programs and data are retained in a nonvolatile memory media that may be accessed by a compact disk-read only memory (CD-ROM) drive, compact disk-read/write memory (CD-R/W) drive, optical drive, digital versatile disc (DVD) drive, hard drive, tape drive and floppy disk drive, all generally indicated by reference numeral 18 in FIG. 9. A network interface 22 couples the processor 12 to a wide area network such as the Internet.

As noted above, the present invention can be distributed for use on the computer system for the client 10 as machine instructions stored on a memory media such as a floppy disk 24 that is read by the floppy disk drive. The program would then typically be stored on the hard drive so that when the user elects to execute the application program to carry out the present invention, the machine instructions can readily be loaded into memory 14. Control of the computer and selection of options and input of data are implemented using input devices 20, which typically comprise a keyboard and a pointing device such as a mouse (neither separately shown). Further details of system for the client 10 and of the computer comprising it are not illustrated, since they are generally well known to those of ordinary skill in the art. Additionally, although not shown, computer systems for the node server 120 and the server array controller 118 could be configured in substantially the same way as the computer system for the client 10 illustrated here, albeit different in other ways.

Cookie types

It is further envisioned that other types of Cookies may be used to identify a path that would be used to exchange data packets between the client and a destination such as a host machine, firewall, router or a node server managed by a server array controller. A "path" type of Cookie could be used to indicate the actual route and interim destinations that the data packets must use to travel between the client (source side) and the destination (supply side). For example, the path Cookie could indicate the individual routers that must be used to send data packets containing the HTTP requests and/or HTTP responses between the client and the destination.

A "hops" type of Cookie could be used to indicate an intermediate destination in the route the data packets must use to travel between the client and the destination. For example, a hops cookie could indicate a particular router that must always be used to send data packets containing the HTTP requests and/or HTTP responses between the client and the destination.

A "priority" type of Cookie may be used to indicate a priority for processing a data packet containing an HTTP request ahead of other data packets. Also, each priority Cookie could include a range of values indicating a level of priority. In this way, a data packet containing an HTTP request and a priority Cookie with the high priority value would be processed (sent) ahead of other data packets that contained HTTP requests and lower priority Cookies.

A "load balancing" Cookie could be used to indicate the load balancing method that the server array controller should perform to select the optimal node server to provide access to the resources when an HTTP request does not include a current Cookie with information identifying a destination. It is also envisioned that multiple types of Cookies and information could be included in HTTP requests and HTTP responses.

Additionally, it is envisioned that a unique identification of a client or a destination may be represented as encoded information in the Cookie. The result of an equation or a hash value or may be used to encode the destination uniquely identified in the Cookie. A hash value (or simply hash) is a number generated from a string of text. The hash is substantially smaller than the text itself, and it is generated by a formula in such a way that it is extremely unlikely that some other text will produce the same hash value. Generally, the sender generates a hash of a message, encrypts the hash, and sends it with the message itself. The recipient then decrypts both the message and the hash, produces another hash from the received message, and compares the two hashes. If they're the same, there is a very high probability that the message was transmitted intact. A hash provides a quickly determinable value in the Cookie for identifying a relationship between the client and the destination.

An exemplary equation for directly determining the ip address of a selected node server (N) is as follows:

$$ip4 = N\%256;$$

$$ip3 = ((N-ip4)/256)\%256;$$

$$ip2 = ((N-ip4-ip3*256)/(256*256))\%256;$$

$$ip1 = ((N-ip4-ip3*256-ip2*256*256)/(256*256*256))\%256;$$

Where the ip address for N=ip1*256*256*256+ ip2*256*256+ip3*256+ip4.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. Method for load balancing access to a resource identified in a hyper text transport protocol (HTTP) request, comprising:
   (a) examining an HTTP request to determine when a Cookie is included with the HTTP request, the Cookie including information that indicates a destination for accessing the resource identified in the HTTP request;
   (b) when the Cookie is included in the HTTP request, sending the HTTP request to the destination that is indicated by the Cookie's information;
   (c) generating an HTTP response at the destination, the HTTP response providing access to the requested resource;
   (d) inserting a copy of the information in the Cookie into the HTTP response; and
   (e) sending the HTTP response with the copy of the information in the Cookie to the sender of the HTTP request, so that a subsequent HTTP request to access the resource will include another Cookie with information indicating that the resource is accessible at the destination.

2. The method of claim 1, further comprising:
   (a) sending the HTTP request to a server array controller that manages a plurality of node servers; and
   (b) employing the server array controller to select one of the plurality of node servers to receive the HTTP request based on the information in the Cookie, the selected node server being associated with the destination.

3. The method of claim 2, wherein the selected node server generates the HTTP response.

4. The method of claim 3, further comprising including an identifier with the copy of the information in the Cookie, the identifier associating the selected node server with the destination.

5. The method of claim 4, further comprising encoding the identifier.

6. The method of claim 5, further comprising employing a mathematical product to encode the identifier.

7. The method of claim 6, wherein the mathematical product includes a hash value.

8. The method of claim 4, further comprising generating a time stamp that is included in the HTTP response.

9. The method of claim 4, further comprising:
   (a) employing the server array controller to insert the copy of the information in the Cookie into the HTTP response; and
   (b) employing the server array controller to rewrite a data packet that includes the HTTP response and the copy of the information in the Cookie.

10. The method of claim 4, wherein the selected node server generates the HTTP response and includes a blank identifier in the copy of the information in the Cookie.

11. The method of claim 10, further comprising employing the server array controller to write the identifier over the blank identifier in the copy of the information in the Cookie.

12. The method of claim 4, further comprising employing the selected node server to include the copy of the information in the Cookie with the generated HTTP response.

13. The method of claim 8, wherein the selected node server generates the time stamp that is included in the HTTP response.

14. The method of claim 8, wherein the server array controller generates the time stamp that is included in the HTTP response.

15. The method of claim 2, further comprising:
   (a) when the Cookie is not included in the HTTP request, employing the server array controller to select one of the plurality of node servers to receive the HTTP request and generate the HTTP response providing access to the requested resource; and
   (b) sending the HTTP response from the selected node server to the sender of the HTTP request, the HTTP response including information for creating another Cookie at the sender, so that a subsequent HTTP request to access the resource will include the other Cookie with information indicating that the selected node server is the destination for accessing the requested resource.

16. The method of claim 15, further comprising employing the server array controller to balance the load demand on the plurality of node servers by determining an optimal node server to receive the HTTP request and generate the HTTP response.

17. The method of claim 16, wherein the server array controller employs at least one of a plurality of functions to determine the optimal node server to balance the load demand on the plurality of node servers, the plurality of functions including round trip time, round robin, least connections, packet completion rate, quality of service, server array controller packet rate, topology, global availability, hops, static ratio and dynamic ratio.

18. The method of claim 2, further comprising:
   (a) until the HTTP request is provided to the server array controller, employing the server array controller to buffer communication between the sender and the destination; and
   (b) when the HTTP request is provided to the server array controller, replaying in consecutive order the buffered communication to at least one of the plurality of node servers that is associated with the destination.

19. The method of claim 1, further comprising including a plurality of Cookies in the HTTP request, each Cookie having a different type.

20. The method of claim 19, further comprising determining a type for each Cookie, the type of each Cookie indicating how the information included in each Cookie is to be utilized.

21. The method of claim 1, wherein the sender includes at least one of a client, server and host machine.

22. The method of claim 1, wherein the destination includes at least one of a host machine, server array controller, router, node server, firewall and client.

23. Method for load balancing access to a resource identified in a hyper text transport protocol (HTTP) request, comprising:
   (a) examining an HTTP request to determine when a Cookie is included with the HTTP request, the Cookie including information that identifies a sender of the HTTP request;
   (b) when the Cookie is included in the HTTP request, comparing the information identifying the sender to a table of at least one destination, the HTTP request being sent to a destination that is associated with the identified sender in the table;
   (c) generating an HTTP response at the destination, the HTTP response providing access to the requested resource;
   (d) inserting a copy of the information in the Cookie into the HTTP response; and
   (e) sending the HTTP response with the copy of the information in the Cookie to the identified sender of the HTTP request, so that a subsequent HTTP request to access the resource from the identified sender will include another Cookie with information that identifies the sender of the subsequent HTTP request.

24. The method of claim 23, further comprising a server array controller that manages a plurality of node servers, wherein the server array controller compares the information identifying the sender to the destination that is associated with the identified sender in the table, the destination being one of the node servers managed by the server array controller.

25. The method of claim 24, further comprising employing the server array controller to insert the copy of the information in the Cookie into the HTTP response.

26. The method of claim 24, further comprising:
   (a) employing the node server to insert blank information into the HTTP response; and
   (b) employing the server array controller to rewrite the blank information to include the copy of the information in the Cookie, the server array controller sending the HTTP response with the copy of the information in the Cookie to the sender identified in the HTTP request.

27. A system for load balancing access to a resource indicated in a hyper text transport protocol (HTTP) request, comprising:
   (a) a memory for storing logical instructions; and
   (b) a processor for executing the logical instructions stored in the memory, the execution of the logical instructions causing functions to be performed including:

(i) examining an HTTP request to determine when a Cookie is included with the HTTP request, the Cookie including information that indicates a destination for accessing the resource identified in the HTTP request;

(ii) when the Cookie is included in the HTTP request, sending the HTTP request to the destination that is indicated by the Cookie's information;

(iii) generating an HTTP response at the destination, the HTTP response providing access to the requested resource;

(iv) inserting a copy of the information in the Cookie into the HTTP response; and (v) sending the HTTP response with the copy of the information in the Cookie to the sender of the HTTP request, so that a subsequent HTTP request to access the resource will include another Cookie with information indicating that the resource is accessible at the destination.

28. A system for load balancing access to a resource indicated in a hyper text transport protocol (HTTP) request, comprising:

(a) a memory for storing logical instructions; and (b) a processor for executing the logical instructions stored in the memory, the execution of the logical instructions causing functions to be performed, including:

(i) examining an HTTP request to determine when a Cookie is included with the HTTP request, the Cookie including information that identifies a sender of the HTTP request;

(ii) when the Cookie is included in the HTTP request, comparing the information identifying the sender to a table of at least one destination, the HTTP request being sent to a destination that is associated with the identified sender in the table;

(iii) generating an HTTP response at the destination, the HTTP response providing access to the requested resource;

(iv) inserting a copy of the information in the Cookie into the HTTP response; and (v) sending the HTTP response with the copy of the information in the Cookie to the identified sender of the HTTP request, so that a subsequent HTTP request to access the resource from the identified sender will include another Cookie with information that identifies the sender of the subsequent HTTP request.

29. A method for load balancing access to a resource identified in a hyper text transport protocol (HTTP) request, comprising:

(a) receiving an HTTP request at a server array controller from a sender;

(b) employing the server array controller to examine the HTTP request to determine when a Cookie is included with the HTTP request, wherein the Cookie includes information that indicates a destination server for accessing the resource identified in the HTTP request;

(c) sending the HTTP request to the destination server indicated by the Cookie's information;

(d) at the destination server, generating an HTTP response that provides access to the requested resource and includes a copy of the information in the Cookie; and (e) sending the HTTP response to the sender of the HTTP request, so that a subsequent HTTP request from the sender to access the resource will include another Cookie with information indicating that the resource is accessible at the destination server.

30. The method of claim 29, further comprising when the HTTP request is determined to be without the Cookie, selecting one of a plurality of destination servers and sending the HTTP request to the selected destination server.

31. The method of claim 30, further comprising in the HTTP response from the selected destination server, including a new Cookie with information to identify the selected destination server.

32. The method of claim 30, further comprising:

(a) adding a new Cookie to the HTTP request forwarded to the selected destination server; and (b) rewriting the new Cookie with new information identifying the selected destination server and including the rewritten new Cookie in the HTTP response from the selected destination server.

33. A method for load balancing access to requests from at least one client to a plurality of servers, comprising:

(a) receiving a Hypertext Transfer Protocol (HTTP) request from a client, the HTTP request comprising a request for access to a resource provided by at least one of the plurality of servers;

(b) determining whether the HTTP request includes a Cookie comprising information associated with a destination server of the plurality of servers;

(c) if the HTTP request does not include said Cookie, selecting, by a server array controller, a server of the at least one of the plurality of servers based on a load balancing algorithm and forwarding the HTTP request to the selected server;

(d) receiving, by the server array controller, an HTTP reply from the selected server, the HTTP reply comprising Cookie information and a command to create a Cookie;

(e) writing, by the server array controller, in the Cookie information, identification data for identifying the selected server;

(f) sending the HTTP reply with the identification data to the client; and (g) if the determining of step (b) determines that the HTTP request includes said Cookie, forwarding the HTTP request to the destination server.

34. The method of claim 33, wherein each Cookie further comprises priority information that designates a priority of the HTTP request.

35. The method of claim 33, wherein each Cookie further comprises hops information that designates an intermediate destination between the client and the destination server.

36. The method of claim 33, wherein the identification data identifies the selected server without requiring an association between the client and the selected server.

37. The method of claim 33, wherein the identification data identifies the client, and wherein forwarding the HTTP request to the specified server comprises retrieving a mapping between the client and the specified server.

38. The method of claim 33, wherein the selected server sends the HTTP reply in a data packet having a length and wherein in writing the identification data in the Cookie information the length remains unchanged.

39. A method for load balancing access to requests from at least one client to a plurality of server, comprising:

(a) receiving a Hypertext Transfer Protocol (HTTP) request from a client, the HTTP request comprising a request for access to a resource provided by at least one of the plurality of servers;

(b) determining whether the HTTP request includes a Cookie that comprises information identifying a destination server and expiration data that indicates expiration;

(c) if the HTTP request does not include said Cookie or if the expiration data indicates expiration, selecting a server from the at least one of the plurality of servers based on a load balancing algorithm and forwarding the HTTP request to the selected server; otherwise, forwarding the HTTP request to the destiation server (d) receiving an HTTP reply from the selected server, the HTTP reply comprising Cookie information and a command to create a Cookie;

(e) writing, in the Cookie information, identification data for identity the selected server and expiration data that indicates expiration of the Cookie; and (f) sending the HTTP reply with the Cookie information to the client.

40. The method of claim 39, wherein the Cookie information further comprises load balancing method information that designates a load balancing algorithm to be used with an HTTP request.

41. The method of claim 39, further comprising:

(a) determining an amount of traffic to the load balancer; and (b) determining the expiration data at least partially based on the amount of traffic to the load balancer.

42. A method for load balancing access to requests from at least one client to a plurality of servers, comprising:

(a) receiving a Hypertext Transport Protocol (HTTP) request from a client, the HTTP request comprising a request for access to a resource provided by at least one of the plurality of servers;

(b) determining whether the HTTP request includes a Cookie comprising information associated with one of the plurality of servers;

(c) if the HTTP request does not include said Cookie, forwarding, by a server array controller, the HTTP request to a selected destination server of the at least one of the plurality of servers based on a load balancing algorithm;

(d) receiving, at the server array controller, an HTTP reply from the destination server;

(e) inserting, by the server array controller, in the HTTP reply, identification data for identifying the destination server and a command to create a Cookie;

(f) sending the HTTP reply with the Cookie information to the client; and (g) if the determining of step (b) determines that the HTTP request includes said Cookie, forwarding the HTTP request to a destination server indicated by said Cookie.

43. The method of claim 42, wherein the identification data comprises a server identifier.

44. The method of claim 42, wherein the identification data identifies the client, and wherein forwarding the HTTP request to the destination server comprises retrieving a mapping between the client and the selected server.

45. A method for load balancing access to requests from at least one client to a plurality of servers, comprising:

(a) receiving a Hypertext Transport Protocol (HTTP) request from a client, the HTTP request comprising a request for access to a resource provided by at least one of the plurality of servers;

(b) determines whether the HTTP request includes a Cookie comprising information associated with a specified one of the plurality of servers;

(c) if the HTTP request does not include said Cookie, forwarding the HTTP request to a selected server of the at least one of the plurality of servers based on a load balancing algorithm;

(d) receiving an HTTP reply from the selected server, the HTTP reply comprising an identification of the selected server and a command to create a Cookie;

(f) forwarding the HTTP reply to the client; and (g) if the determining of step (b) determines that the HTTP request includes said Cookie, forwarding the HTTP request to the specified server.

46. The method of claim 45, further comprising:

(a) inserting expiration data in the HTTP reply;

(b) if the HTTP request includes said Cookie, determining whether the expiration data in said Cookie indicates expiration; and (c) if the expiration data indicates expiration, forwarding the HTTP request to a server based on a load balancing algorithm.

47. A load balancing device in a network comprising a plurality of clients and a plurality of servers, comprising:

(a) a mechanism that receives a Hypertext Transport Protocol (HTTP) request from a client;

(b) computer executable instructions that determine a destination server of the plurality of servers, based on a load balancing algorithm;

(c) means for determining whether the client has previously communicated with the destination server, based on persistence information in an HTTP Cookie;

(d) means for, if the client has previously communicated with the destination server, determining the destination server, based on the persistence information in the HTTP Cookie; and (e) computer executable instructions that forward the HTTP request to the destination server.

48. The load balancing device of claim 47, further comprising means for commanding the client to create a Cookie comprising information identifying the destination server.

49. The load balancing device of claim 48, further comprising computer executable instructions that receive an HTTP Cookie from the destination server and insert the persistence information in the HTTP Cookie.

50. The load balancing device of claim 47, further comprising:

(a) computer executable instructions for receiving an HTTP reply from the destination server; and (b) means for adding the persistence information to the HTTP reply.

51. A load balancing system, comprising:

(a) a plurality of servers;

(b) a controller that receives a Hypertext Transport Protocol (HTTP) request from a client and forwards the HTTP request to a destination server of the plurality of servers;

wherein the destination server sends to the controller an HTTP reply;

wherein the controller receives the HTTP reply, modifies the HTTP reply by adding persistence information in an HTTP Cookie, and sends the modified HTTP reply to the client;

wherein the controller determines whether a second HTTP request includes the HTTP Cookie comprising the persistence information; and wherein if the second HTTP request includes the HTTP Cookie comprising the persistence information, forwarding the second HTTP request to the destination server.

52. The load balancing system of claim 51, wherein if the second HTTP request includes the HTTP Cookie comprising the persistence information, removing at least the persistence information prior to forwarding the second HTTP request.

* * * * *

UNITED STATES PATENT AND TRADEMARK OFFICE
CERTIFICATE OF CORRECTION

PATENT NO. : 6,473,802 B2
DATED : October 29, 2002
INVENTOR(S) : Masters

It is certified that error appears in the above-identified patent and that said Letters Patent is hereby corrected as shown below:

Column 20,
Line 57, "server" should read -- servers --

Column 21,
Line 9, "identity" should read -- identifying --
Line 58, "determines" should read -- determining --

Signed and Sealed this

Twenty-fifth Day of February, 2003

JAMES E. ROGAN
*Director of the United States Patent and Trademark Office*